(12) United States Patent
Narayanan et al.

(10) Patent No.: US 12,647,318 B2
(45) Date of Patent: Jun. 2, 2026

(54) UPDATING ACCESS POINTS OF A COMMUNICATION NETWORK

(71) Applicant: Hewlett Packard Enterprise Development LP, Spring, TX (US)

(72) Inventors: Santhana Krishnan Narayanan, Bangalore (IN); Raghunandan Prabhakar, Bangalore (IN); Abhishek Kumar, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 2 days.

(21) Appl. No.: 18/739,481

(22) Filed: Jun. 11, 2024

(65) Prior Publication Data

US 2025/0300884 A1     Sep. 25, 2025

(30) Foreign Application Priority Data

Mar. 21, 2024     (IN) .............................. 202441022029

(51) Int. Cl.
H04L 41/082        (2022.01)
H04L 41/0893       (2022.01)
(52) U.S. Cl.
CPC ........ H04L 41/082 (2013.01); H04L 41/0893 (2013.01)
(58) Field of Classification Search
CPC ............. H04L 41/0803; H04L 41/0813; H04L 41/082; H04L 41/0893; H04L 41/12;

H04L 43/0811; H04L 67/10; H04L 67/34; H04W 16/10; H04W 16/20; H04W 24/02; H04W 24/04; H04W 84/12; H04W 88/08
See application file for complete search history.

(56) References Cited

U.S. PATENT DOCUMENTS

| | | | |
|---|---|---|---|
| 10,645,598 B2 * | 5/2020 | Arjun .................... | H04L 41/082 |
| 2009/0327177 A1 * | 12/2009 | Kirovski ................. | G06F 17/11 |
| | | | 706/46 |
| 2018/0242165 A1 * | 8/2018 | Macmullan ........... | H04W 16/18 |
| 2020/0099578 A1 * | 3/2020 | Venkateshwaran ... | H04W 24/02 |
| 2020/0100155 A1 * | 3/2020 | Gupta ................... | H04L 41/082 |
| 2022/0191714 A1 * | 6/2022 | Vuggrala .............. | H04W 48/20 |

* cited by examiner

*Primary Examiner* — Christopher Biagini
(74) *Attorney, Agent, or Firm* — Slater Matsil, LLP

(57)                ABSTRACT

In certain implementations, a method includes obtaining network information for a plurality of access points (APs) that are configured to provide user devices with access to a communication network, and determining, according to the network information, partitions in which to divide the APs for deploying a software update to the APs. The method includes dividing, according to a vertex coloring algorithm, the APs into the partitions. The APs correspond to vertices of the vertex coloring algorithm, and neighbor relationships of the APs correspond to edges of the vertex coloring algorithm. The method includes transmitting software update instructions to the APs to cause APs of a first partition to execute a reboot for installing the software update on the APs of the first partition at a different time than APs of a second partition execute a reboot for installing the software update on the APs of the second partition.

20 Claims, 9 Drawing Sheets

300

302        304

| AP ID | PARTITION ID |
|-------|--------------|
| AP1 | 2 |
| AP2 | |
| AP3 | 2 |
| AP4 | 1 |
| AP5 | 5 |
| AP6 | |
| AP7 | 5 |
| AP8 | 4 |
| AP9 | 1 |
| AP10 | |
| AP11 | 5 |
| AP12 | 3 |
| AP13 | 3 |
| AP14 | 5 |
| AP15 | 4 |
| AP16 | |
| AP17 | 1 |
| AP18 | 2 |
| ● | ● |
| ● | ● |
| ● | ● |
| APN | 3 |

FIGURE 3

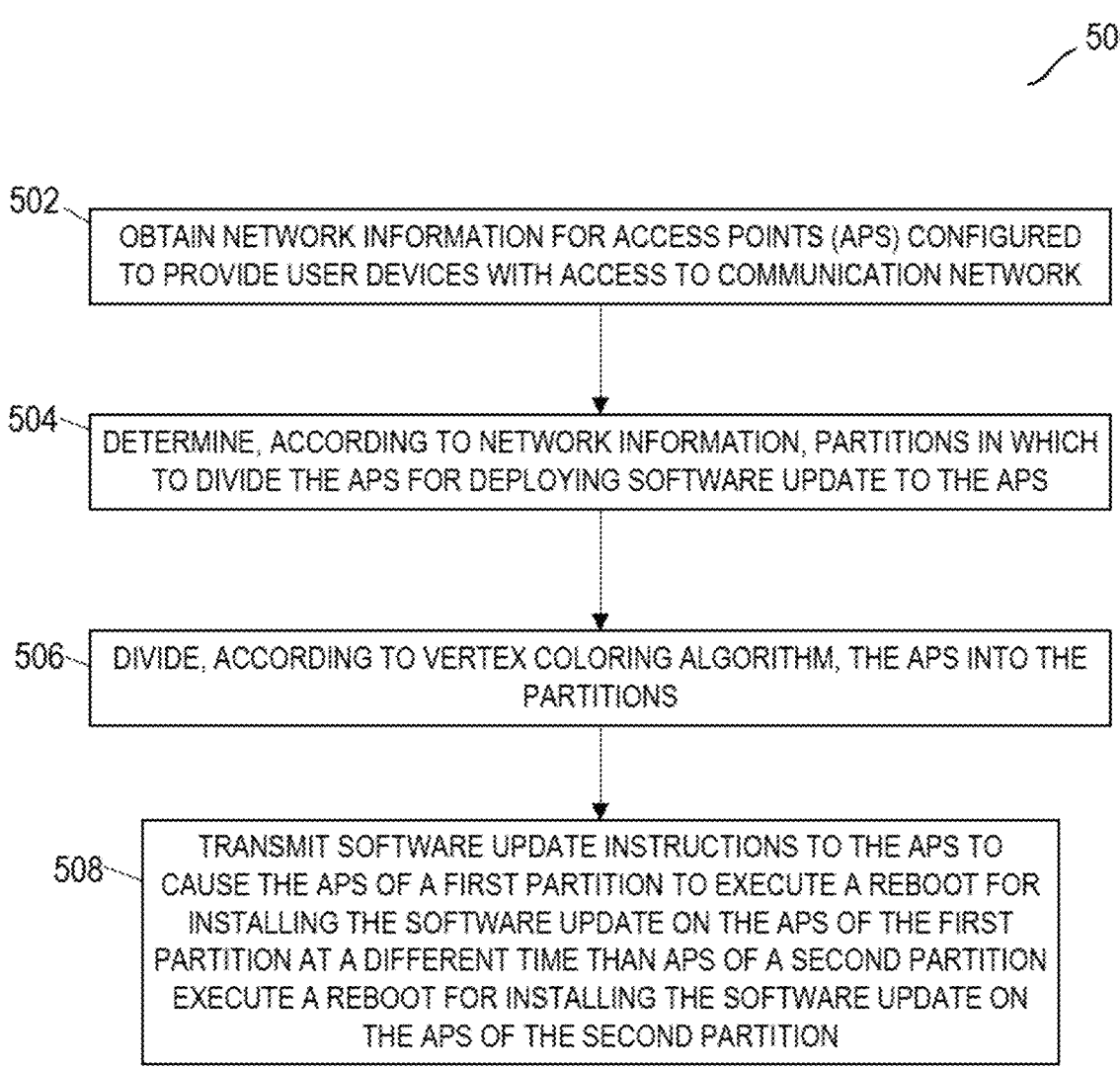

500

502 — OBTAIN NETWORK INFORMATION FOR ACCESS POINTS (APS) CONFIGURED TO PROVIDE USER DEVICES WITH ACCESS TO COMMUNICATION NETWORK

504 — DETERMINE, ACCORDING TO NETWORK INFORMATION, PARTITIONS IN WHICH TO DIVIDE THE APS FOR DEPLOYING SOFTWARE UPDATE TO THE APS

506 — DIVIDE, ACCORDING TO VERTEX COLORING ALGORITHM, THE APS INTO THE PARTITIONS

508 — TRANSMIT SOFTWARE UPDATE INSTRUCTIONS TO THE APS TO CAUSE THE APS OF A FIRST PARTITION TO EXECUTE A REBOOT FOR INSTALLING THE SOFTWARE UPDATE ON THE APS OF THE FIRST PARTITION AT A DIFFERENT TIME THAN APS OF A SECOND PARTITION EXECUTE A REBOOT FOR INSTALLING THE SOFTWARE UPDATE ON THE APS OF THE SECOND PARTITION

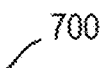

700

DIVIDE, ACCORDING TO ITERATIVE PROCESS, ACCESS POINTS (APS) INTO PARTITIONS

702

702a  SELECT, FROM APS THAT REMAIN UNASSIGNED TO A PARTITION, A CURRENT AP FOR A CURRENT ITERATION OF THE ITERATIVE PROCESS

702b  IDENTIFY, ACCORDING TO PARTITIONS ASSIGNED TO NEIGHBOR APS OF CURRENT AP, SELECTED PARTITION TO ASSIGN TO CURRENT AP

702c  ASSIGN, IN RESPONSE TO IDENTIFYING SELECTED PARTITION, SELECTED PARTITION TO CURRENT AP

702d  ANY APS REMAIN UNASSIGNED TO PARTITION ?

Y

N

704  TRANSMIT, IN RESPONSE TO DETERMINING THAT APS HAVE BEEN ASSIGNED A CORRESPONDING PARTITION, SOFTWARE UPDATE INSTRUCTIONS TO THE APS TO CAUSE APS OF A FIRST PARTITION TO EXECUTE REBOOT FOR INSTALLING SOFTWARE UPDATE ON THE APS OF THE FIRST PARTITION AT A DIFFERENT TIME THAN APS OF A SECOND PARTITION EXECUTE REBOOT FOR INSTALLING SOFTWARE UPDATE ON APS OF SECOND PARTITION

FIGURE 7

UPDATING ACCESS POINTS OF A COMMUNICATION NETWORK

BACKGROUND

A communication network includes various electronic devices that are able to communicate with one another via one or more communication interfaces. For example, a wireless local area network (WLAN) is a wireless computer network that links two or more electronic devices using a wireless distribution technique (e.g., radio or infrared signals). A WLAN typically is implemented within a limited area such as a home, college, school, or an office complex. A communication network, some or all of which may be a wireless network, may include numerous electronic devices, such as user devices, access points (APs), controllers, and switches. A WLAN communication network, for example, may include numerous electronic devices, such as one or more user devices, one or more wireless APs (WAPs), one or more WLAN controllers, and one or more network switches. WAPs may be network devices to which user devices connected wirelessly to access a communication network.

BRIEF DESCRIPTION OF THE DRAWINGS

For a more complete understanding of this disclosure, and advantages thereof, reference is now made to the following descriptions taken in conjunction with the accompanying drawings, in which:

FIG. 3 illustrates example partition assignment table, according to certain implementations;

FIG. 5 illustrates an example method for updating APs of a communication network, according to certain implementations;

FIG. 7 illustrates an example method for updating APs of a communication network, according to certain implementations.

DESCRIPTION

Figure 1:
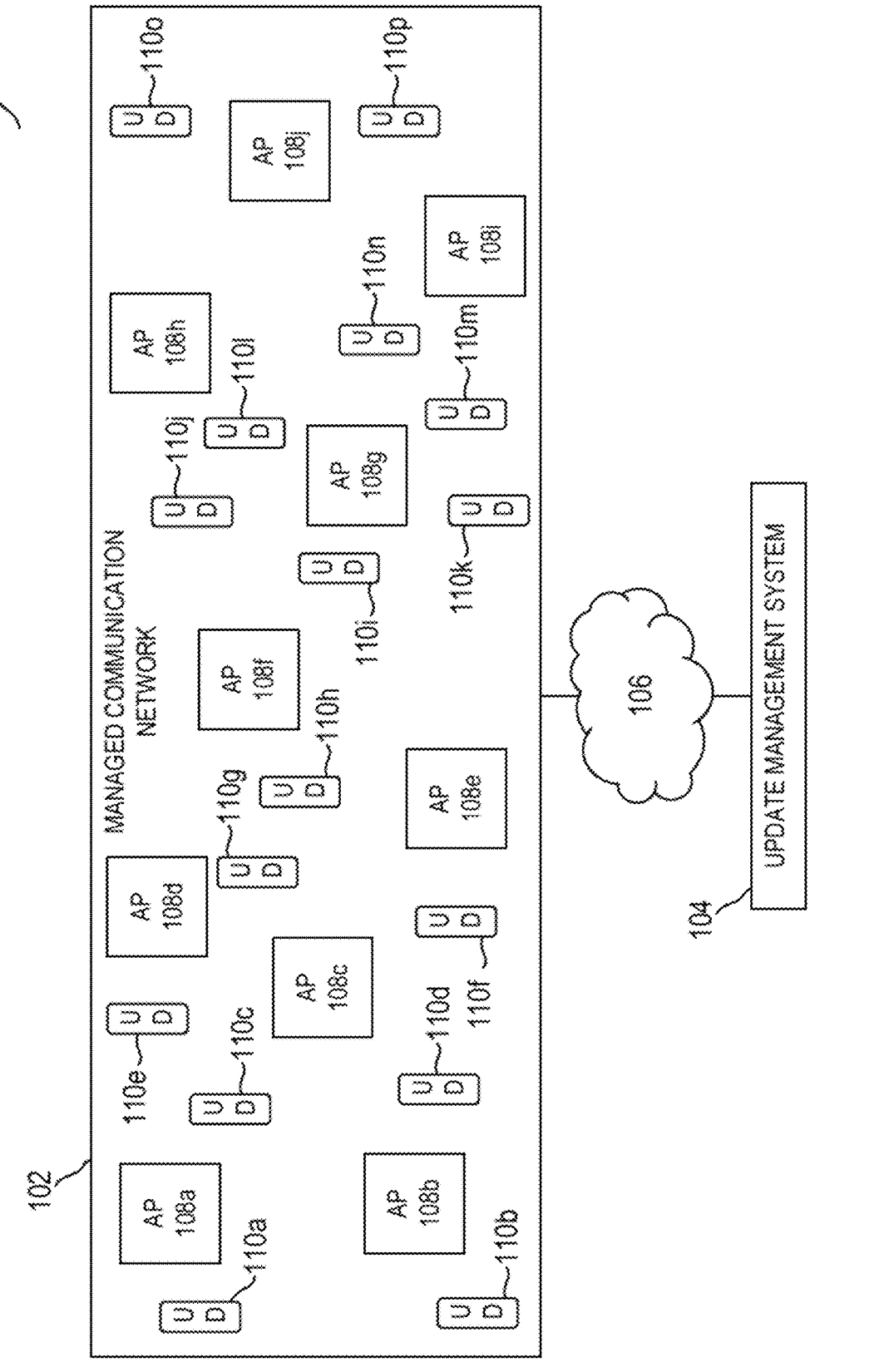
FIG. 1 illustrates an example system for updating APs of a communication network, according to certain implementations.

A communication network, including potentially a WLAN, may be managed via one or more network management systems (NMSs), which may be coupled to the managed communication network (e.g., WLAN) switches and/or controllers, possibly via another network. The one or more NMSs may be used to maintain and secure the network. For example, an NMS may manage electronic devices connected to the communication network. Among other operations, whether for network security or for other purposes, the NMS may detect and monitor electronic devices that are coupled to the communication network or otherwise detectable by other electronic devices in the communication network. Network information related to various electronic devices may be aggregated at various points within the communication network and reported to the NMS.

Within a communication network, APs may operate, in part, using software installed on or otherwise accessible to the AP. APs may execute an operating system, as well as a variety of other software to perform the intended functionality of the AP. Such other software may include, for example, a database storing state information for the AP, and various other daemons, processes, threads, agents, etc., which may, for example, be implemented as any number of microservices running on the operating system of the AP. For purposes of this disclosure, software may include software and/or firmware.

From time to time, it may be appropriate to deploy software updates to the APs, whether to enhance security, provide additional/modified functionality, or for any other suitable purpose. Furthermore, it may be desirable to deploy software updates to APs at a time when those APs are live, such as when those APs are available for providing, and potentially actually are providing, user devices with access to a communication network. This so-called live update technique may reduce or eliminate an approach of finding a specific downtime, most likely at an odd time of day or month, to perform the software update or to otherwise simply accept that certain physical areas may lack network connectivity for a period of time while a software update is executed.

The NMS may manage the software update, potentially including making the software update available to the APs and managing which APs have completed the software update. One technique for updating such software includes installing the new versions of any updated software (e.g., from a software image that includes updates to various daemons, databases, etc.), and rebooting the AP, after which the new versions of the software will execute. However, such a technique may disrupt an ability of an AP to process network traffic while the reboot of the AP executes. For example, rebooting an AP may disrupt service to user devices connected to a communication network via the AP, causing the user devices to become disconnected from the communication network, potentially with no other available AP to which to transfer to regain network connectivity. Certain software update approaches attempt to group the APs for purposes of executing the software update; however, these solutions typically result in excessive quantities of partitions, which may extend overall software update time as each partition is updated serially.

Certain implementations of this disclosure partition APs for a software update using a vertex coloring algorithm, which is an example of a graph coloring algorithm. An NMS or other suitable computer system may obtain network information, which may include network topography information and/or other information, for a communication network to which a software update is to be deployed. The network topography information may include identification of network devices (e.g., APs) and neighbor information for the network devices (e.g., neighbor APs for each AP), potentially in the form of a radio frequency (RF) neighbor graph or from which such a neighbor graph can be generated. Other network information may include network load and the like. The NMS may determine a quantity of partitions in which the APs are to be divided according to the network information.

The NMS then divides the APs into the determined quantity of partitions according to the network information, including according to the network topology information, using the vertex coloring algorithm (e.g., a modified version of a DSatur vertex coloring algorithm). The vertex coloring algorithm may be an iterative process that assigns APs to partitions one-by-one until the APs have been assigned a corresponding partition. In general, the vertex coloring algorithm attempts to assign an AP to a partition to which none of the neighbor nodes of that AP are assigned, with variations when that goal is not possible.

Certain implementations of this disclosure may provide one or more technical advantages. Certain implementations may implement a more strategic approach to updating the software of APs deployed and operating throughout a communication network that allows a subset of the APs to remain live while other APs are rebooted as part of the update process. For example, relative to certain other techniques for partitioning APs for software updates, certain implementations may reduce a quantity of partitions, which may decrease overall software update time. As a particular example, for dense deployments of APs, certain implementations may result in two-to-six partitions rather than twenty or more as might be generated with other techniques (e.g., RF-channel-based partitioning) for partitioning APs for a software update. Certain implementations may allow the quantity of partitions to be tailored based on actual user device load on the communication network. For example, a lightly-loaded communication network might be updated even faster with just two partitions, if appropriate. In certain implementations, even if additional RF channels are created dynamically through operation of the communication network, the quantity of partitions may remain the same, potentially increasing predictability of software update time. Of course, with any of these examples, the particular quantity of partitions may depend on a variety of factors.

Certain implementations may reduce network disruptions relative to other solutions for performing a live software update, which may reduce or eliminate negative impacts to an organization during a software update. In scenarios in which the software update is provided or managed by a third party (e.g., a service provider), the reduced disruptions to a communication network may increase customer confidence in the software update process.

Turning to the figures, FIG. 1 illustrates an example system 100 for updating APs of a communication network, according to certain implementations. In the illustrated example, system 100 includes a managed communication network 102, an update management system 104, and communication network 106. Although a particular implementation of system 100 is illustrated and described, this disclosure contemplates any suitable implementation of system 100.

In general, update management system 104 is configured to implement a potentially live software update of one or more APs of managed communication network 102. In certain implementations, update management system 104 may be configured to determine a quantity of partitions in which to divide APs of managed communication network 102. In certain implementations, update management system 104 is configured to divide the APs of managed communication network 102 into the determined quantity of partitions according to a vertex coloring algorithm. In certain implementations, update management system 104 is configured to divide the APs into the quantity of partitions according to an iterative process that includes selecting, from the APs that remain unassigned to a partition of the quantity of partitions, a current AP for a current iteration of the iterative process; identifying, according to one or more partitions assigned to neighbor APs of the current AP, a selected partition to assign to the current AP; assigning, in response to identifying the selected partition, the selected partition to the current AP; and performing, in response to determining that one or more APs remain unassigned to a partition, a next iteration of the iterative process.

Update management system 104 is configured to then transmit, in response to determining that the APs have been assigned a corresponding partition of the determined quantity of partitions, software update instructions to the APs. The software update instructions are to cause APs of a first partition of the quantity of partitions to execute a reboot for installing a software update on the APs of the first partition at a different time than APs of a second partition of the quantity of partitions execute a reboot for installing the software update on the APs of the second partition.

Managed communication network 102 may include controllers, APs, switches, routers, or the like for providing network connectivity to user devices. Managed communication network 102 may be one facility or may span multiple facilities, and may be located at one general geographic location or may span multiple geographic locations.

Managed communication network 102 may include one or more APs 108a-108j, which may be referenced generally as AP 108/APs 108, and one or more user devices 110a-110p, which may be referenced generally as user device 110/user devices 110. Although FIG. 1 shows managed communication network 102 to include particular numbers of APs 108 and user devices 110, managed communication network 102 may include any suitable numbers of APs 108 and user devices 110.

In general, APs 108 may provide a point of access to a communication network, such as managed communication network 102. APs 108 may control network access of user devices 110 and, in certain implementations, may authenticate user devices 110 for connecting to APs 108 and through APs 108, potentially to other devices within managed communication network 102 or outside of managed communication network 102. An AP 108 may be implemented using any suitable combination of hardware, firmware, and software that is configured to provide wireless network connectivity to wireless user devices (e.g., user devices 110). APs 108 may communicate with the network over connections, which may be wired or wireless interfaces.

WAPs 102 may each include a device, such as a wireless router, that allows wireless devices (e.g., client devices 108) to connect to the WLAN implemented by some or all of computing environment 100. WAPs 102 may each act as radio transmitters for a WLAN. WAPs 102 may each translate network traffic into radio signals and transmit those signals to wireless enabled processing devices. For example, WAPs 102 may each act as a bridge to a wired local area network (LAN). In the illustrated example, WAPs 102 may each be connected to a wired network via WLAN controller 104, which in turn may be coupled to a cable in order to allow wireless enabled computers (e.g., client devices 108) access to a wired network.

APs 108 may be dispersed throughout a physical environment (e.g., throughout a facility or campus) to provide connectivity to user devices 110 as those user devices 110 move throughout the physical environment. This disclosure contemplates the physical environment in which APs are dispersed being one or multiple geographic locations, potentially spanning a large area and potentially including multiple geographic regions that are physically remote from each other (e.g., different buildings and/or sites). APs 108 may be spaced apart in two or more dimensions. For example, managed communication network 102 may be a business facility, and APs 108 may be dispersed throughout the business facility to provide user devices 110 with network access to other devices of managed communication network and/or to other communication networks (e.g., to the Internet).

User devices 110 may represent any type of computing device capable of reading machine-executable instructions and network connectivity. Examples of the computing device may include a server, a desktop computer, a notebook computer, a tablet computer, a thin client, a mobile device, a personal digital assistant (PDA), a smart phone, a printer, and Internet-of-Things device, or any other suitable type of computing device. In certain embodiments, a user device 110 includes a wireless network interface (e.g., a wireless network interface card (NIC)) that allows user device 110 to perform wireless communication with another device, such as one or more APs 108.

One or more structures may be located in the physical environment in which managed communication network 102 is implemented. Those structures may include walls, floors, furniture, windows, or other potential obstacles that may interfere with or otherwise obstruct an ability of user devices 110 to connect to a particular AP 108. Furthermore, an AP 108 may have a limited range in which user devices 110 may connect to the AP 108. In some implementations, APs 108 may be positioned throughout a physical environment in a manner that promotes availability of an AP 108 to a user device 110 regardless of where the user device 110 is in the physical environment. In certain implementations, APs 108 may be positioned throughout the physical environment in a manner that provides whole or partial overlap of coverage areas of the APs 108, potentially providing redundant available connections in certain areas. This approach may increase the opportunity for a user device 110 to find an available AP 108 for connection even if one or more APs 108 is temporarily or permanently out of service, such as may be the case when an AP 108 experiences a technical problem, reboots, or is otherwise unavailable.

Each of APs 108 can provide network connectivity to multiple user devices 110 based on the ability of the user device 110 to connect to a corresponding AP 108. As a user device 110 travels around the physical environment, the user device 110 may maintain network connectivity by connecting to multiple APs 108 sequentially (e.g., potentially based on the AP 108 that provides the strongest signal to the network and/or according to other suitable factors). Taking an example in which a business associated with managed communication network 102 occupies an entire floor of an office building, multiple APs 108 may be positioned throughout the floor. As a user device 110 moves from one end of the floor to another, the user device 110 may sequentially connect to multiple APs 108 to maintain network connectivity.

APs 108 may include any suitable combination of hardware, firmware, and software. For purposes of this disclosure, it will be understood that software includes software, firmware, or both software and firmware. APs 108 may execute or otherwise run the software of APs 108 to provide some or all of the functionality of APs 108. The software of APs 108 may be updateable. For example, APs 108 may be configured to receive a software update and install the software update according to techniques described in this disclosure. In certain implementations, installing a software update on an AP 108 may involve rebooting the AP 108. For example, to complete a software update of an AP 108, in some scenarios a reboot of the AP 108 may be performed.

APs 108 may be configured to provide certain network information to one or more other devices of system 100. For example, APs 108 may provide network information to update management system 104, directly or potentially indirectly through one or more other devices that are configured to provide the network information to update management system 104. The contents of the network information are described in greater detail below but may include information useful to update management system 104 for managing a software update of APs 108. Some or all of this network information may be provided to another system associated with update management system 104 for one or more purposes in addition to managing a software update of APs 108. For example, update management system 104 may be, or may be part of, an NMS, and the NMS may collect the network information for a variety of purposes associated with managing managed communication network 102.

Update management system 104 may be configured to control a portion or all of managed communication network 102, including APs 108. For example, update management system 104 may be a central point of control that is accessible by the administrators of managed communication network 102. In certain implementations, update management system 104 could be, or could be part of, an NMS. Update management system 104 is a computer system that is configured to control a software update of APs 108.

Update management system 104 may be (or may be part of) a computer system that includes any suitable components. Suitable components may include one or more processors, one or more application-specific integrated circuits (ASICs), a microcontroller, memory, and/or other suitable components. Update management system 104 may be a physical device (e.g., an NMS computer). Update management system 104 may receive commands from a user interface and display output with the user interface. The user interface may be a command line interface, a graphical user interface, a web interface, or another suitable type of interface. Update management system 104 may process the commands from the user interface, validate the commands, and execute logic specified by the commands. Update management system 104 may output the results of commands via the user interface. An administrator may access update management system 104 using the user interface. The user interface may be a central point of access for update management system 104.

Update management system 104 may from time to time seek to deploy a software update to APs 108. For purposes of this disclosure, a software update may include a software update, a firmware update, or both a software update and a firmware update. As subsequently described in greater detail, update management system 104 may coordinate the software updates of APs 108. As described above, in certain computing environments, it may be desirable to execute a so-called live update. A live update generally refers to executing a software update when a communication network (e.g., managed communication network 102) is available to carry, and potentially actually is carrying, live traffic (e.g., associated with user devices 110). For example, a live update of APs 108 may include a software update at a time when APs 108 are at least available to potentially serve a user device 110 (though at any particular time, a given AP 108 might or might not be actually serving any user devices 110).

Update management system 104 may store or otherwise have access to software updates and may provide those software updates to APs 108. A software update may include multiple phases. For example, a software update may include downloading the software update to an AP 108 and activating the downloaded software update. The software update may be downloaded to an AP 108 in any suitable manner. For example, AP 108 may periodically (or at any suitable interval or instance) check with update management system 104 to determine whether a software update is available and, if so, request that update management system 104 transmit the software update to the AP 108. As another example, update management system 104 may notify an AP 108 when a software update is available. Activating the software may include installing the software update on the AP 108, such as by running one or more installer programs or in any other suitable manner. To complete activation of some software updates, an AP 108 may be rebooted, which may temporarily render the AP 108 unavailable to user devices 110.

In general, update management system 104 is configured to implement a potentially live software update of one or more APs of managed communication network 102. As part of managing a software update of APs 108, update management system 104 may partition APs 108 into multiple partitions for deploying the software updates to APs 108. Dividing APs 108 into partitions for deploying a software update to APs 108 may stagger the times at which APs 108 reboot to activate the software update and are unavailable to user devices 110.

Update management system 104 may partition APs 108 using a vertex coloring algorithm. Prior to applying the vertex coloring algorithm, update management system 104 may be configured to determine a quantity of partitions in which APs 108 of managed computing network 102 are to be divided. Update management system 104 may be configured to then divide APs 108 of managed communication network 102 into the determined quantity of partitions according to a vertex coloring algorithm. In certain implementations, update management system 104 is configured to divide APs 108 into the quantity of partitions according to an iterative process that includes selecting, from APs 108 that remain unassigned to a partition of the quantity of partitions, a current AP 108 for a current iteration of the iterative process; identifying, according to one or more partitions assigned to neighbor APs 108 of the current AP 108, a selected partition to assign to the current AP 108; assigning, in response to identifying the selected partition, the selected partition to the current AP 108; and performing, in response to determining that one or more APs 108 remain unassigned to a partition, a next iteration of the iterative process.

Update management system 104 is configured to then transmit, in response to determining that APs 108 have been assigned a corresponding partition of the determined quantity of partitions, software update instructions to APs 108. The software update instructions are to cause APs 108 of a first partition of the quantity of partitions to execute a reboot for installing a software update on the APs 108 of the first partition at a different time than APs 108 of one or more other partitions of the quantity of partitions execute a reboot for installing the software update on the APs 108 of the other partitions. In certain implementations, the APs 108 all partitions are updated (and particularly, rebooted) at distinct times.

In general, the vertex coloring algorithm of certain implementations attempts to assign neighboring APs to different partitions. This may increase the chances that a user device 110 that is disconnected from a first AP 108 for the first AP 108 to reboot may be able to connect to a second AP 108 that is a neighbor of the first AP 108.

Update management system 104 may communicate with components of managed communication system 102 via communication network 106. Communication network 106 may facilitate wireless and/or or wired communication. Communication network 106 may communicate, for example, IP packets, Frame Relay frames, ATM cells, voice, video, data, and other suitable information between network addresses. Communication network 106 may include any suitable combination of one or more local area networks (LANs), radio access networks (RANs), metropolitan area networks (MANs), wide area networks (WANs), mobile networks (e.g., using WiMax (802.16), WiFi (802.11), 3G, 4G, 5G, or any other suitable wireless technologies in any suitable combination), all or a portion of the global computer network known as the Internet, and/or any other communication system or systems at one or more locations, any of which may be any suitable combination of wireless and wired. Communication network 106 may include controllers, APs, switches, routers, or the like for forwarding traffic between update management system 104 and managed communication network 102. In certain implementations, at least a portion of communication network 106 may be an Ethernet network.

Update management system 104 may receive network information from components of managed communication network 102. For example, the network information may be received from APs 108 and/or other components of managed communication network 102 (e.g., from one or more controllers, routers, switches, or other components). The network information may include network topology information, network performance information, and/or any other suitable information. For example, the network information may include identifiers of APs 108, neighbor information for APs 108, distance information for APs 108, traffic/load information for APs 108, and/or any other suitable information.

Update management system 104 may store network information, which may be received from network devices in managed communication network 102 or otherwise determined from network information received from network devices in managed communication network 102. The network information is described in greater detail below with reference to FIG. 2. Update management system 104 may use the network information to identify the APs 108 of managed communication network 102, determine a quantity of APs 108 of managed communication network 102, determine neighbors of APs 108, determine distances between APs 108, determine network traffic and/or network load of managed communication network 102, and/or for any other suitable purpose. Some or all of network information and/or the information determined from network information may be used to determine a quantity of partitions in which to divide APs 108 and/or to divide, using a vertex coloring algorithm, APs 108 into the determined quantity of partitions.

While FIG. 1 illustrates a particular configuration of components, this disclosure contemplates other suitable configurations. For example, although FIG. 1 shows certain components as being part of the same device, any of the components may be grouped in sets of one or more components which may exist and execute as part of any number of separate and operatively connected devices. As another example, a single component may be configured to perform all or any portion of the functionality performed by the components shown in FIG. 1. Accordingly, implementations disclosed herein should not be limited to the configuration of components shown in FIG. 1.

Figure 2:
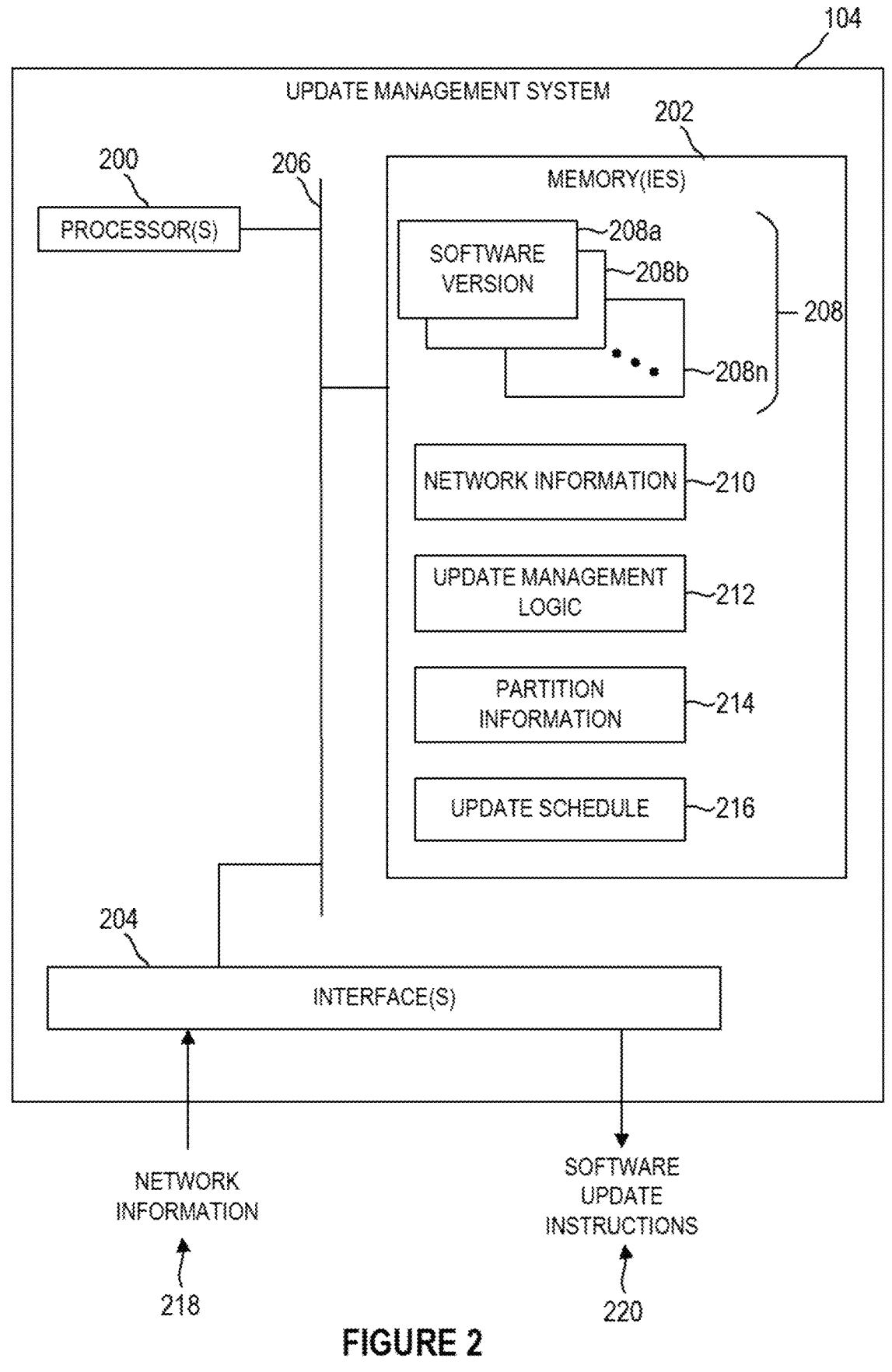
FIG. 2 illustrates an example update management system, according to certain implementations.

FIG. 2 illustrates an example update management system 104, according to certain implementations. In the illustrated example, update management system 104 includes one or more processors 200, memory 202, and one or more interfaces 204, all of which may communicate using links 206, and all of which may be referred to in the singular for simplicity. The components of update management system 104 may be implemented in any suitable combination of hardware, firmware, and software. Portions of update management system 104 may described in connection with features of system 100 shown in FIG. 1.

Processor 200 may be any component or collection of components adapted to perform computations and/or other processing-related tasks. Processor 200 can be, for example, a microprocessor, a microcontroller, a control circuit, a digital signal processor, a field-programmable gate array (FPGA), an application-specific integrated circuit (ASIC), a system-on-chip (SoC), or combinations thereof. Processor 200 may include one or more processing cores. Processor 200 may include any suitable number of processors, or multiple processors may collectively form a single processor 200.

Memory 202 may include any suitable combination of volatile memory, non-volatile memory, and/or virtualizations thereof. For example memory may include any suitable combination of magnetic media, optical media, random access memory (RAM), read-only memory (ROM), removable media, and/or any other suitable memory device. Memory 202 may include data structures used to organize and store all or a portion of the stored data. Memory 202 may include a non-transitory computer-readable medium that stores programming for execution by one or more of the one or more processor 200. One or more modules of update management system 104 may be partially or wholly embodied as software and/or hardware for performing any functionality described herein. For example, one or more modules of update management system 104 may be embodied as software.

Interfaces 204 represent any suitable computer element that can receive information from a communication network (e.g., communication network 106 of FIG. 1) and transmit information through a communication network (e.g., communication network 106 of FIG. 1), or both. Interfaces 204 represent any port or connection, real or virtual, including any suitable combination of hardware, firmware, and software, including protocol conversion and data processing capabilities, to communicate through a LAN, WAN, or other communication system that allows information to be exchanged. Interfaces 204 may facilitate wireless and/or wired communication.

Links 206 may include any suitable wired or wireless communication medium for the components of update management system 104 to communicate with one another. For example, links 206 may include any suitable combination of a bus or communication network.

Returning to memory 202, in the illustrated example, memory 202 stores one or more software versions 208a-208n (referred to generally as software version/versions 208), network information 210, update management logic 212, partition information 214, and update schedule 216. Each of these is described in greater detail below.

Software versions 208 include the one or more versions of software for APs 108 of FIG. 1. For example, software versions 208 may include one or more past versions of the software installed on APs 108 of FIG. 1. Additionally or alternatively, software versions 208 may include one or more versions of software to be installed on some or all of APs 108 of FIG. 1. For example, software versions 208 may include a software update to be installed on APs 108 of FIG. 1. Software versions 208 may include software and/or firmware versions/updates.

A software version 208 may be a software package stored in a repository, which may be a file store, key-value store, or another suitable type of storage. The repository could be local to (e.g., stored on a memory of update management system 104) or remote from (e.g., a remote file server accessible to update management system 104) update management system 104.

Network information 210 may include information associated with a managed communication network (e.g., managed communication network 102 of FIG. 1). Network information 210 may include AP IDs of APs 108 of FIG. 1, AP neighbor information for APs 108 of FIG. 1, distances between neighbor APs 108 of FIG. 1, network traffic/load information, and/or any other suitable information. At least a portion of network information 210 may include and/or may be usable to determine network topology information and or network performance information (e.g., network traffic/load information). For example, at least a portion of network information 210 may include or may be usable to determine a neighbor graph of APs 108 of managed communication network 102, an example of which is illustrated in and described with reference to FIG. 4.

AP IDs may take any suitable form, and potentially multiple forms. For example, an AP ID may be reported in a first format (e.g., a Service Set Identifier (SSID) and/or Basic Service Set Identifier (BSSID)) by an AP 108, and update management system 104 may assign another name (e.g., AP4) that maps to that AP ID.

AP neighbor information may include an identification, for each AP 108, of neighboring APs 108 for the AP 108. Distances between neighbor APs 108 may include information indicating a distance between neighboring APs 108. In certain implementations, AP neighbor information and distances between neighbor APs 108 may be determined using RF information associated with APs 108. For example, RF neighbor data may be generated by each AP 108. For example, each AP 108 may electronically correspond with other APs 108 in the RF domain. Each AP 108 may learn the pathloss for its neighboring APs 108 from media access control (MAC) beacon frames or Over-the-Air (OTA) communications. For example, as defined in the Institute of Electrical and Electronics Engineers (IEEE) 802.11 (e.g., the set of LAN protocols), the MAC beacon frame may include information about a device (e.g., an AP 108), including an SSID, one or more BSSIDs, frequency channels, supported rates, and/or other possible information.

Each AP 108 may periodically transmit RF neighbor data and/or neighbor pathloss data to update management system 104 via communication network 106. Update management system 104 may use the pathloss data to create connected weighted neighbor graph(s) where each vertex (e.g., node) of the graph corresponds to one AP 108, and each edge of the graph corresponds to a link between an AP 108 and a neighbor AP 108. In certain implementations, if the pathloss metric between two APs 108 is more than a threshold, then the two APs 108 might not be considered neighbors. In certain implementations, if the pathloss metric between two APs 108 is less than a threshold, then the two APs 108 might be considered neighbors. In some scenarios, a user device 110 might be able to roam between neighboring APs 108 with little or no disassociation or data loss.

In certain implementations, update management system 104 may determine distances between APs 108 based on network information 210 (e.g., pathloss information). Additionally or alternatively, one or more devices associated with managed communication network 102 may determine distances between APs 108 and may communicate those distances to update management system 104 as part of network information 210. Although using a pathloss measurement is described as a basis for determining distance between APs 108, distances between APs 108 may be determined in any suitable manner.

The network performance information, such as the network traffic/load information, may include information received from managed communication network 102, such as from APs 108 and/or other network devices, indicating an amount of traffic being processed by managed communication network 102. For example, the network traffic/load information may indicate to update management system 104 a load on managed communication network. Update management system 104 may track the network traffic/load information over time. Update management system 104 may use the network traffic/load information as part of determining a quantity of partitions in which to divide APs 108 for performing a software update, for determining a time at which to instruct a software update to APs 108, and/or for other suitable reasons.

As illustrated in FIG. 2, network information 218 might be received by update management system 104. For example, update management system 104 may receive network information 218 from APs 108 of managed communication network 102 of FIG. 1 and/or from one or more other elements that may aggregate network information from APs 108 of FIG. 1. For example, one or more network controllers and/or network switches of managed communication network 102 may aggregate information received from some or all of APs 108 and may report that information or derivatives of that information as part of network information 218. In certain implementations, portions of network information 218 may be received from user devices 110 of managed communication network 102 of FIG. 1, if appropriate.

Network information 218 may include AP IDs of APs 108 of FIG. 1, AP neighbor information for APs 108 of FIG. 1, distances between neighbor APs 108 of FIG. 1, RF measurements taken by APs 108 of FIG. 1, pathloss information recorded by APs 108, and/or any other suitable information. Any information described as being included in network information 218 may be stored as part of network information 210, and any information described as being included in network information 210 may have been received as part of network information 218.

Update management system 104 may store some or all of network information 218 directly as network information 210. Additionally or alternatively, update management system 104 may determine certain information from network information 218, and then store the determined information as part of network information 210. For example, to the extent network information 218 does not directly identify neighbors of APs 108, network information 218 may include certain information (e.g., RF measurements and the like) that may be used by update management system 104 to determine neighbors of APs 108, estimates of distances between APs 108, and/or other suitable information.

Update management logic 212 may include instructions for analyzing some or all of network information 210/218; determining a quantity of partitions in which to divide APs 108; dividing, according to a vertex coloring algorithm and using at least a portion of the network information 210/218, APs 108 into the determined quantity of partitions; and transmitting software update instructions 220 (described below) to APs 108 to execute the software update. Update management logic 212 may perform this partitioning in accordance with techniques described throughout this disclosure.

Update management logic 212 may process network information 218 to determine identities of the APs 108 of managed communication network 102, a quantity of APs 108 of managed communication network 102, neighbors of APs 108, distances between some or all APs 108 (e.g., distances between neighbor APs 108), network traffic and/or network load of managed communication network 102, and/or any other suitable network information 210. Network information 218 may include some of this network information 210 and/or update management logic 212 may analyze network information 218 to determine some of this network information 210.

Update management logic 212 may determine a quantity of partitions in which to divide APs 108 for performing a software update. This disclosure contemplates update management logic using any suitable process or algorithm to determine a quantity of partitions in which to divide APs 108 for performing a software update. Some or all of network information 210 may be used to determine a quantity of partitions in which to divide APs 108.

In certain implementations, the quantity of partitions in which to divide APs 108 may be determined according to a current user device load on managed communication network 102 (e.g., the quantity of user devices 110 in managed communication network 102, as may be determined from network information 210/218). For example, assume managed communication network 102 includes 500 APs 108, and that each AP 108 can serve an average of 10 user devices 110. In this example, if 2500 user devices 110 are currently connected, then the load is 50%, which could be carried by just 250 APs 108. If the quantity of partitions were selected as 3, then approximately 165 of APs 108 (~500/3) can reboot, while the remaining 335 APs 108 can serve user devices 110. As another example, if 3500 user devices 110 are currently connected, then the load is 70%. If the quantity of partitions were selected as 5, when about 100 of APs 108 reboot, the remaining 400 APs 108 can serve user devices 110.

As just one particular example, the quantity of partitions in which to divide APs 108 may be determined according to the following formula:

$$P = \text{ceiling}\left(\frac{C_{AP}A}{C_{AP}A - C(1 + R_U)}\right)$$

In this example, $C_{AP}$ represents the quantity of user devices 110 that a single AP 108 can handle (e.g., the user device capacity of a single AP 108); A represents the quantity of APs 108 in managed communication network 102; C represents the quantity of user devices 110 connected to managed communication network 102 (e.g., connected to an AP 108 of managed communication network 102); $R_U$ is a redundancy ratio during a software update; and P represents the quantity of partitions.

To provide additional explanation of this example formula, some additional variables and associated details may be helpful. For example, R may represent a redundancy ratio of a network in which the APs operate (e.g., managed communication network 102), $A_P$ may represent a quantity of APs 108 in a partition, $A_U$ may represent a quantity of APs

108 up and running (e.g., from partitions other than a partition being rebooted) during a reboot of a partition, and Ac may represent a quantity of APs 108 suitable to a carry current client load (e.g., a current quantity of user devices 110 in managed communication network 102). The following equations describe certain relationships among these variables, according to certain embodiments.

$$A_u = A - A_P$$

$$A_P = \frac{A}{P}$$

To further describe a redundancy ration (R), during reboot of a partition, it may be desirable to for client capacity (e.g., capacity of APs 108 to serve user devices 110) of remaining running APs 108 ($A_U$) to be sufficient to carry network client load C (e.g., the quantity of user devices 110 connected to managed communication network 102) and some additional capacity to provide redundancy. $R_U$ may be the redundancy ratio during reboot of a partition, which may be the ratio of the desired extra APs 108, such as the quantity of APs 108 that are suitable to carry the current client load (e.g., a current quantity of user devices 110 in managed communication network 102). For example, if 100 APs 108 are sufficient to carry the current client load, and the desired redundancy ratio ($R_U$) to be 0.25, the it may be appropriate to keep 125 APs 108 up and running during a reboot of the APs 108 of a partition.

In certain embodiments, the following equation may describe a quantity of APs 108 up and running (e.g., from partitions other than a partition being rebooted) during a reboot of a partition ($A_U$).

$$A_u = A_C + R_u A_C$$

In certain embodiments, the following equation may represent a quantity of APs 108 suitable to a carry current client load (e.g., a current quantity of user devices 110 in managed communication network 102) (Ac).

$$A_C = \frac{C}{C_{AP}}$$

Making appropriate substitutions may result in the following equation.

$$A_u = \frac{C}{C_{AP}} + R_u \frac{C}{C_{AP}}$$

Appropriate reduction may result in the following equation.

$$A_u = \frac{C}{C_{AP}}(1 + R_u)$$

From the above equations for the number of APs 108 up and running during reboot of partition, the following equation may be determined.

$$A - \frac{A}{P} = \frac{C}{C_{AP}}(1 + R_u)$$

Rearranging the above equation results in the following equation.

$$\frac{A}{P} = A - C\frac{(1 + R_u)}{C_{AP}}$$

Rewriting the right-hand side using the common denominator $C_{AP}$ results in the following equation and associated rewriting.

$$\frac{A}{P} = \frac{C_{AP}A - C(1 + R_u)}{C_{AP}}$$

$$P = \frac{C_{AP}A}{C_{AP}A - C(1 + R_u)}$$

Because this equation may yield a fraction, it may be desirable to take a ceiling of this value, as represented by the following equation, which corresponds to the above example equation determining a quantity of partitions in which to divide APs 108.

$$P = \text{ceiling}\left(\frac{C_{AP}A}{C_{AP}A - C(1 + R_u)}\right)$$

In certain implementations, the "current" traffic/load for a managed communication network 102 and/or associated APs 108 generally refers to approximately the time partitioning is performed and/or a software update (e.g., AP reboots associated with a software update) are to be performed. This may allow the determination of the quantity of partitions to flexibly adapt to network conditions of managed communication network 102. In some scenarios, a managed communication network 102 that is experiencing a heavy load may call for a different quantity of partitions than a communication network 102 that is under a lighter load. This disclosure is not limited to this interpretation of "current" traffic/load.

Update management logic 212 may divide, for purposes of performing a software update of APs 108, APs 108 into the determined quantity of partitions according to a vertex coloring algorithm. In certain implementations, the vertex coloring algorithm is an iterative process that update management logic 212 applies to APs 108 one-by-one until some or all APs 108 are assigned to a partition of the quantity of partitions. In certain implementations, the vertex coloring algorithm applied by update management logic 212 is a modified version of a DSatur vertex coloring algorithm. Although vertex coloring algorithms may be thought of as items to a color of a set of colors, it should be understood that colors are just a metaphor for groups. In this example, the groups are partitions of APs for purposes of updating software of the APs.

Additional details of an example vertex coloring algorithm in accordance with certain implementations are described below with reference to FIGS. 6A-6B. In general, however, certain implementations of the vertex coloring algorithm may attempt to assign an AP 108 to a partition to which none of the neighbor APs 108 of that AP 108 are assigned, with variations when that goal is not possible. Update management logic 212 may use network information 210 to generate a neighbor graph (e.g., an RF neighbor graph), an example of which is shown in and described below with reference to FIG. 4, and update management logic 212 may access the neighbor graph as part of applying the vertex coloring algorithm to divide APs 108 into the determined quantity of partitions.

In certain implementations, to execute the iterative process, update management logic 212 may select an AP 108 during each iteration and assign that AP 108 to one of the determined quantity of partitions according to the vertex coloring algorithm. APs 108 initially may be marked as unpartitioned and partitions initially may have 0 assigned APs 108. In certain implementations, while at least one AP 108 remains unassigned to a partition, update management logic 212 may execute the iterative process as follows:

(1) Select a next AP 108 to assign to a partition, such as by selecting, from among the remaining unpartitioned APs 108, an AP 108 that has a greatest quantity of neighbor APs 108 that are assigned to a partition. If multiple APs 108 exist that have a same greatest quantity of neighbor APs 108 that are assigned to a partition (e.g., those APs 108 are tied for having a greatest quantity of neighbor APs 108 that are assigned to a partition), update management logic 212 may select from those APs 108 the AP 108 with most neighbor APs 108 (e.g., whether those neighbor APs 108 area assigned a partition or remain unassigned a partition). If multiple APs 108 remain tied under this additional test, update management logic 212 may select any AP 108 that remains unassigned a partition. The selected AP 108 may be referred to as the current AP 108.

(2) Update management logic 212 then may assign a partition to the current AP 108. In this example, to select the partition to assign to the current AP 108, update management logic 212 may identify the partitions (e.g., using partition IDs) that remain unassigned to any neighbor APs 108 of the current AP 108. If multiple partitions remain unassigned to any of the neighbor APs 108 of the current AP 108, update management logic 212 may select the partition that has been assigned to the fewest quantity of APs 108 across all APs 108 (e.g., all APs 108 of managed communication system 102). If update management logic 212 is unable to identify any partitions (e.g., using partition IDs) that remain unassigned to any neighbor APs 108 of the current APs 108, then update management logic 212 may select a partition (e.g., using a partition ID) that has been assigned to the fewest neighbor APs 108 of the current AP 108.

Update management logic 212 may then assign the current AP 108 selected at step (1) to the partition selected at step (2). Update management logic 212 then may return to step (1) to attempt to select another AP 108 as the current AP 108 for another iteration of the iterative process. If all APs 108 have been assigned to a partition, the iterative process may end.

Update management logic 212 may use some or all of network information 210 to divide APs 108 into the determined quantity of partitions using a vertex coloring algorithm. For example, update management logic 212 may use the AP IDs to determine the set of APs 108 to partition for the software update. As another example, update management logic 212 may use the quantity of APs, the neighbor information, and traffic/load information when determining the quantity of partitions. As another example, update management logic 212 may use the neighbor information as part of applying the vertex coloring algorithm (e.g., when determining which partition to assign to an AP 108 that is the subject of a current iteration of the iterative process), and may use the AP IDs for purposes of recording the assignment of a partition to an AP 108. Although update management logic 212 is described as using particular network information 210 to perform particular operations, update management logic 212 may use any suitable network information 210 and/or other information to perform particular operations.

Update management logic 212 may determine an update schedule for instructing APs 108 to install an update and reboot. Additional details are described below with reference to update schedule 216 of FIG. 2.

Update management logic 212 may transmit software update instructions to cause APs 108 to install a software update, including activating the software update, such as by rebooting. Software update instructions are described in greater detail below with reference to software update instructions 220 of FIG. 2.

Update management logic 212 may store assignments of APs 108 to partitions as partition information 214. Partition information 214 may include the current, and potentially historical, mapping of APs to partitions. As update management logic 212 assigns APs 108 to partitions, update management logic 212 may update partition information 214 to reflect update assignments of APs 108 to partitions (e.g., by storing the updated assignments of APs 108 to partitions as in partition information 214). Update management logic 212 may access partition information 214 as part of applying the vertex coloring algorithm (e.g., to determine assignment of APs 108 to partitions, as appropriate, during the iterative process).

Partition information 214 may be, or may include, a data structure (e.g., a table) with entries (e.g., rows) that map APs 108 (e.g., as represented by AP IDs) to the respective partitions to which the APs 108 have been assigned. Additionally or alternatively, the table may include entries (e.g., rows) that correspond to a partition and a second column that lists the APs 108 (e.g., as represented by AP IDs) that are assigned to that partition. Although described primarily as a table, partition information 214 may have any suitable data structure. Additional details regarding an example of at least a portion of partition information 214 is illustrated and described below with reference to FIG. 3.

Update schedule 216 may store a schedule of when partitions of APs 108 are to reboot. Update schedule 216 may include an ordered list of partitions (e.g., P1, P2, P3, P4, and so on), particular times for a reboot to be instructed by update management system 104 and/or executed by APs 108 of a partition, and/or other suitable information. Update schedule 216 may specify that the determined partitions of APs 108 are to update sequentially, with no two partitions updating simultaneously; however, this disclosure contemplates update schedule 216 specifying that two or more partitions of APs 108 update concurrently if appropriate for a given implementation.

Software update instructions 220 may be communicated by update management logic 212. Software update instructions 220 may include the instructions communicated by update management system 104 (e.g., update management logic 212) to APs 108 to cause APs 108 to perform a software update according to update schedule 216. Software update instructions 220 are to cause APs 108 of a first partition of the determined partitions to execute a reboot for installing a software update on APs 108 of the first partition at a different time than APs 108 of a second partition (and potentially all other partitions) of the determined partitions execute a reboot for installing the software update on the APs 108 of the second partition (and potentially all other partitions). In certain implementations, software update instructions 220 cause the partitions to be updated sequentially, such that the APs 108 of a first partition are updated first, the APs 108 of a second partition are updated second, the APs 108 of a third partition are updated third, and so on, until partitions (the APs 108 of all partitions) have been updated. This disclosure, however, contemplates some partitions being updated concurrently, if appropriate.

Software update instructions 220 may cause APs 108 to immediately or according to another suitable time frame reboot to install a software update, which may cause the APs 108 to disconnect from or otherwise be unavailable to user devices 110. If available, a disconnected user devices 110 may potentially connect to an AP 108 of another partition to continue service. For example, a user device 110 may connect to an AP 108 of another partition than the partition of the AP 108 from which user device 110 was disconnected. The design of the vertex coloring algorithm may promote availability, with little to no interruption, of an AP 108 of another partition to user devices 110 that were previously connected to an AP 108 of a partition whose APs 108 are rebooting. User devices 110 that are disconnected from a rebooting APs 108 of a rebooting partition may move to another AP 108 of another partition (e.g., another nearby AP 108 from another partition) in any suitable manner.

Software update instructions 220 might include the software update (e.g., one or more files that include and/or are capable of installing the software update). Additionally or alternatively, the software update may be provided to a user device 110 separately, and software update instructions 220 may provide instructions regarding when the user device 110 is to activate the software update (e.g., by, at least in part, rebooting). APs 108 may obtain a software update (e.g., a software update image) in any suitable manner, such as over a network connection (e.g., via communication network 106), from a software repository, from a USB device inserted into a USB port of AP 108, etc.).

Update management logic 212 may repartition APs 108 at any suitable time, whether on a set schedule or otherwise. For example, update management logic 212 may redetermine the appropriate quantity of partitions and execute the iterative process to assign APs 108 to the determined quantity of partitions to account for changes in load of managed communication network 102, the addition/removal of APs 108 to/from managed communication network 102, or for any other suitable reason. In certain implementations, update management logic 212 may sometimes or always repartition prior to deploying a software update.

Interfaces 204 facilitate communication (receipt and/or transmission) of messages via one or more communication media, such as via communication network 106 of FIG. 1. In certain implementations, interfaces 204 include one or more ports. Interfaces 204 may facilitate communication (including transmission and/or reception) of network information 218, software update instructions 220, and/or other suitable information. Interfaces 204 may be implemented using any suitable combination of hardware, firmware, and software.

Update management system 104 may be implemented using any suitable combination of hardware, firmware, and software. Some or all of the components of update management system 104 may include programming for execution by processor 200, the programming including instructions to perform some or all of the functionality of update management system 104. As just two examples, update management logic 212 and update schedule 216 (along with any other components of update management system 104) may include programming for execution by processor 200, the programming including instructions to perform some or all of the functionality of update management system 104, including executing the determination of a quantity of partitions for partitioning APs 108 and division of APs 108 into the determined quantity of partitions according to a vertex coloring algorithm.

At least a portion of memory 202 may be considered a computer-readable medium on which computer code (e.g., instructions, such as may be associated with update management logic 212) is stored. References to computer-readable medium, computer-readable storage medium, computer program product, tangibly embodied computer program, or the like, or a controller, circuitry, computer, processor, or the like should be understood to encompass not only computers having different architectures such as single or multi-processor architectures and sequential (Von Neumann) or parallel architectures but also specialized circuits such as FPGAs, ASICs, signal processing devices, and other devices. References to computer program, instructions, logic, code, or the like, should be understood to encompass software for a programmable processor or firmware such as, for example, the programmable content of a hardware device whether instructions for a processor, or configuration settings for a fixed-function device, gate array or programmable logic device, or the like.

While FIG. 2 illustrates a particular configuration of components, this disclosure contemplates other suitable configurations. For example, although FIG. 2 shows certain components as being part of the same device, any of the components may be grouped in sets of one or more components which may exist and execute as part of any number of separate and operatively connected devices. As another example, a single component may be configured to perform all or any portion of the functionality performed by the components shown in FIG. 2. Accordingly, implementations disclosed herein should not be limited to the configuration of components shown in FIG. 2.

FIG. 3 illustrates example partition assignment table 300, according to certain implementations. In particular, partition assignment table 300 shows assignments of APs (e.g., APs 108 of FIG. 1) to partitions, as may be determined by update management system 102 of FIGS. 1 and 2 (e.g., update management logic 212 of FIG. 2). Partition assignment table 300 may be part of partition information 214 of FIG. 2. Although shown in a table format, partition assignments may be stored in any suitable format.

In the illustrated example, partition assignment table 300 includes column 302 and column 304. Column 302 includes AP IDs that correspond to the APs 108 that are being divided into partitions (e.g., APs 108 of managed communication network 102 of FIG. 1). In this example, column 302 includes AP IDs AP1 through APN, with N being any suitable integer greater than 18. Of course, although partition assignment table 300 is shown to include a particular number of AP IDs (corresponding to a particular number of APs 108), partition assignment table 300 may include any suitable number of AP IDs for the communication network being managed. Column 304 includes partition IDs that identify the respective partitions assigned to the APs 108 identified by the AP IDs shown in column 302. AP IDs and partitions IDs may have any suitable format.

In the illustrated example, some APs have been assigned a partition (e.g., AP1, AP3, AP4, AP5, AP7, AP8, AP9, AP11, AP12, AP13, AP14, AP15, AP17, AP18, and APN have been assigned partitions 2, 2, 1, 5, 5, 4, 1, 5, 3, 3, 5, 4, 1, 2, and 3, respectively), while other APs have not yet been assigned a partition (e.g., AP2, AP6, AP10, and AP16). This may mean that update management system 104 of FIG. 1 (e.g., update management logic 212 of FIG. 2) is in the process of applying the vertex coloring algorithm to divide the APs 108 into partitions. Although shown to include a single mapping of APs 108 to partitions, this disclosure contemplates update management system 104 of FIG. 1 storing historical mappings, if appropriate.

Figure 4:
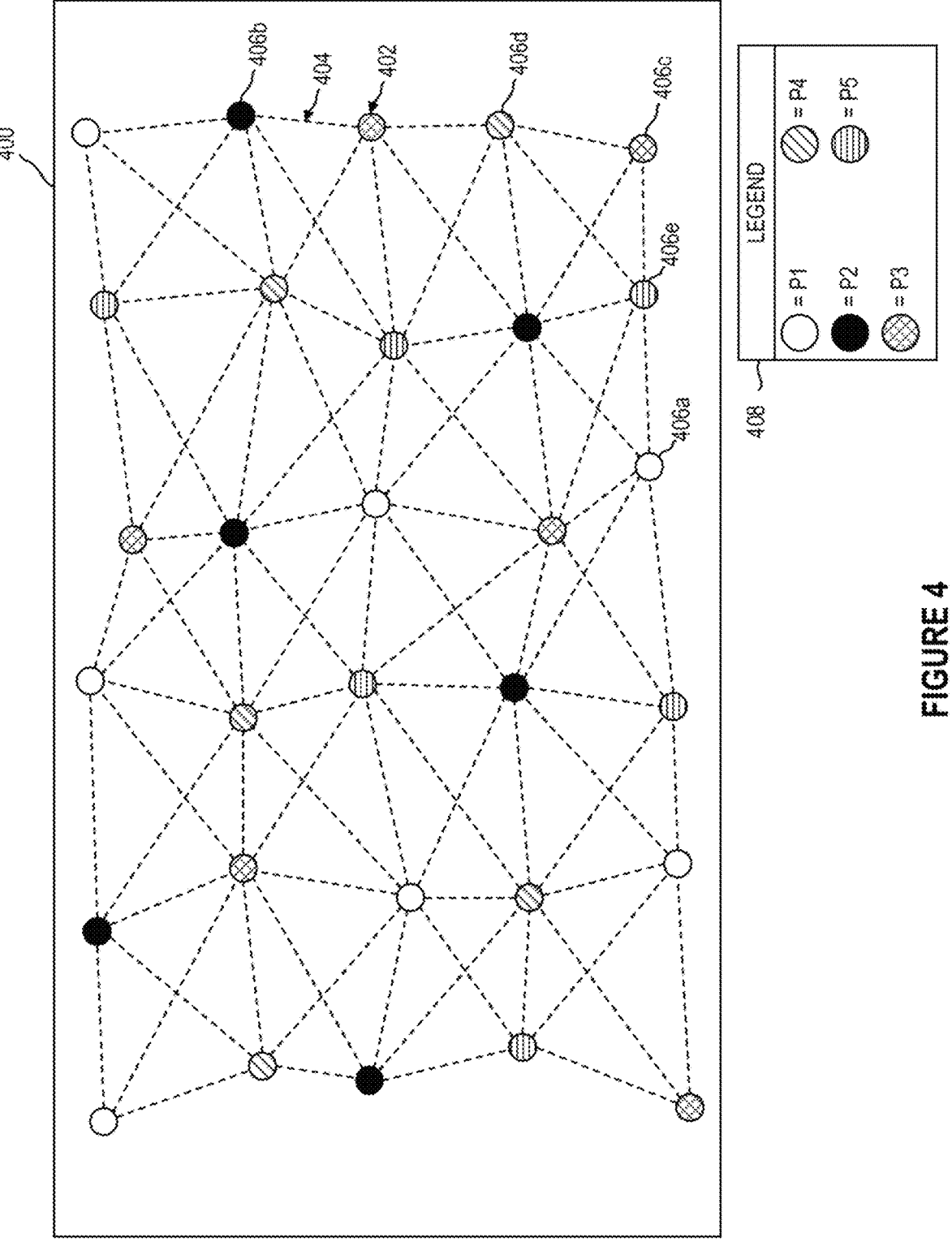
FIG. 4 illustrates an example neighbor graph and associated partitioning of APs, according to certain implementations.

FIG. 4 illustrates an example neighbor graph 400 and associated partitioning of APs, according to certain implementations. In general, a neighbor graph for a communication network may provide a visualization of certain devices in a communication network (e.g., in this example, APs of a managed communication network), neighbor relationships of these devices, and possibly the relative distances (e.g., in a scaled manner) between and among those devices. Neighbor graph 400 may be a representation of a managed communication network (e.g., managed communication network 102 of FIG. 1) that may be determined from the network information 210/218 of FIG. 2). Neighbor graph 400 might or might not be generated, and might or might not be displayed (e.g., by update management system 104 of FIGS. 1 and 2) for executing the partitioning algorithm of this disclosure.

In the illustrated example, neighbor graph 400 includes vertices 402 and edges 404, the latter of which are the connecting lines between vertices 402. Vertices 402 may represent APs 406, and edges 404 may represent a neighbor relationship between the APs 406 that correspond to the vertices 402 connected by the edge 404. In certain implementations, APs 406 may be examples of APs 108 of FIG. 1, and APs 406 may be part of a managed communication network similar to managed communication network 102 of FIG. 1.

An edge 404 may indicate that the APs 406 that correspond to the vertices 402 connected by that edge 404 can hear each other and are neighbors. The network information received by the update management system (e.g., network information 218 received by update management system 104 of FIG. 2) may include pathloss information that can be used to determine distances between APs 406. A user device or AP may transmit a broadcast message and the devices that can receive the broadcast message may be identified with the RF neighbor data. Any loss of the broadcast message may correspond with the neighbor pathloss data and identify the strength or weakness of the network connection from a particular location. The pathloss associated to an edge 404 may indicate how far away the APs 406 that correspond to the vertices 402 connected by that edge 404 are. For example, a lower pathloss may indicate that the APs 406 are closer than a higher pathloss might indicate. As described above, pathloss represents just one technique for determining distances between APs, such as APs 406. If there is no edge 404 between two vertices 402, the APs 406 corresponding to those vertices 402 might not hear each other.

An update management system (e.g., update management system 104 of FIGS. 1 and 2) may have determined a quantity of partitions in which to divide APs 406, and may have divided APs 406 into the determined quantity of partitions using a vertex coloring algorithm in accordance with certain implementations of this disclosure. In the illustrated example, the quantity of partitions determined for APs 406 is five and includes partitions P1, P2, P3, P4, and P5. Partitions P1 through P5 are shown using respective types of shading, as shown in legend 408. A vertex 402 is shaded according to the partition assigned to the AP 406 that corresponds to that vertex 402.

In general, as can be observed from the example of FIG. 4, APs 406 have been partitioned in a way that neighbor APs 406 are assigned to different partitions, though this disclosure contemplates some neighbor APs 406 being assigned to a same partition, as may result from application of the disclose algorithm and/or other factors. This distribution of partitions may help ensure that when a particular AP 406 reboots (along with the other APs that are assigned to the same partition as the particular AP 406), a user device that was connected to the particular AP 406 can maintain service, with little to no interruption, by connecting to another neighbor AP 406 of the particular AP 406, which likely will be assigned to another partition that is not undergoing a reboot at the same time.

It should be understood that the particular arrangement of APs 406 is for example purposes only. Additionally, the particular division of APs 406 into the illustrated partitions P1 through P5 is for example purposes only. Furthermore, the quantity of partitions (5) is for example purposes only, and might or might not bear any relation to the particular quantity of APs 406 represented in neighbor graph 400.

FIG. 5 illustrates an example method 500 for updating APs of a communication network, according to certain implementations. Method 500 will be described using managed communication network 102, APs 108, user devices 110, and update management system 104 as an example. In certain implementations, some or all of the operations of method 500 are performed by update management system 104 (e.g., by update management logic 212 of FIG. 2).

At step 502, update management system 104 may obtain network information 210 for APs 108 of managed communication network 102. As described above, APs 108 are configured to provide one or more user devices 110 with access to a communication network. For example, APs 108 may provide user devices 110 with access to managed communication network 102 and/or other communication networks (e.g., communication network 106). Network information 210 may include network topology information for managed communication network 102, network performance information for managed communication 102, and/or any other suitable information. For example, network information 210 may include AP IDs of APs 108 of FIG. 1, AP neighbor information for APs 108 of FIG. 1, distances between neighbor APs 108 of FIG. 1, network traffic/load information, and/or any other suitable information.

Managed communication network 102 may include APs 108 in a variety of arrangements. For example, APs 108 may include a first AP 108, a second AP 108, a third AP 108, and a fourth AP 108. In a particular implementation, the first AP 108 is a neighbor of the second AP 108; the second AP 108 is a neighbor of the third AP 108; the first AP 108 and the third AP 108 are neighbors; and the fourth AP 108 is not a neighbor of the first AP 108, the second AP 108, or the third AP 108.

A step 504, update management system 104 may determine, according to network information 210, a quantity of partitions in which to divide APs 108 for deploying a software update to APs 108. Update management system 104 may determine the quantity of partitions according to any suitable information and in any suitable manner.

For example, update management system 104 may determine the quantity of partitions according to one or more of a quantity of APs 108, a quantity of user devices 110 served by APs 108, a time of day at which a software update will be performed (e.g., reboots of APs 108 will be instructed), network traffic associated with APs 108, and/or any other suitable information, each of which may be specified in or otherwise determined from network information 210. The quantity of user devices 110 served by APs 108 could be the actual quantity at a particular (possibly current) time, an average over a time period, or another measure of the quantity of user devices 110 served by APs 108. The network traffic associated with APs 108 could be a measure of network traffic at a particular (possibly current) time, an average over a time period, or another measure of network traffic associated with APs 108. In one example, update management system 104 may determine the quantity of partitions according to the quantity of APs 108 and the quantity of user devices 110 served by APs 108.

At step 506, update management system 104 may divide APs 108 into the determined partitions according to a vertex coloring algorithm implemented by update management logic 212. For example, using network information 210, update management logic 212 may generate a neighbor graph (e.g., neighbor graph 400 of FIG. 4) in which APs 108 may correspond to vertices of the neighbor graph, and neighbor relationships of APs 108 may correspond to edges of the neighbor graph. In certain implementations, using the neighbor graph, update management system 104 divides APs 108 into the determined partitions such that each AP 108 is assigned to a single corresponding partition and APs 108 of one partition do not overlap APs 108 of another partition. The vertex coloring algorithm may attempt to divide APs 108 into the determined quantity of partitions such that neighboring APs 108 are not assigned to a same partition; however, in some instances one or more sets of neighboring APs 108 are assigned to a same partition. Additional details regarding an example iterative process for dividing APs 108 into the determined quantity of partitions are described below with reference to FIGS. 6A-6B.

At step 508, update management system 104 may transmit software update instructions 220 to APs 108. Software update instructions 220 are to cause APs 108 of a first partition of the determined partitions to execute a reboot for installing a software update on APs 108 of the first partition at a different time than APs 108 of one or more other partitions of the determined partitions execute a reboot for installing the software update on the APs 108 of the other partition. In certain implementations, software update instructions 220 cause the partitions to be updated sequentially, such that the APs 108 of a first partition are updated first, the APs 108 of a second partition are updated second, the APs 108 of a third partition are updated third, and so on, until partitions (the APs 108 of all partitions) have been updated. In certain implementations, the APs 108 all partitions are updated (and particularly, rebooted) at distinct times. This disclosure, however, contemplates some partitions being updated concurrently, if appropriate.

Software update instructions 220 may cause APs 108 to immediately or according to another suitable time frame reboot to install a software update, which may cause the APs to disconnect from or otherwise be unavailable to user devices 110. If available, a disconnected user devices 110 may potentially connect to an AP 108 of another partition to continue service. For example, a user device 110 may connect to an AP 108 of another partition than the partition of the AP 108 from which user device 110 was disconnected.

Software update instructions 220 might include the software update (e.g., one or more files that include and/or are capable of installing the software update). Additionally or alternatively, the software update may be provided to a user device 110 separately, and software update instructions 220 may provide instructions regarding when the user device 110 is to activate the software update (e.g., by, at least in part, rebooting). APs 108 may obtain a software update (e.g., a software update image) in any suitable manner, such as over a network connection (e.g., via communication network 106), from a software repository, from a USB device inserted into a USB port of AP 108, etc.).

Figure 6A:
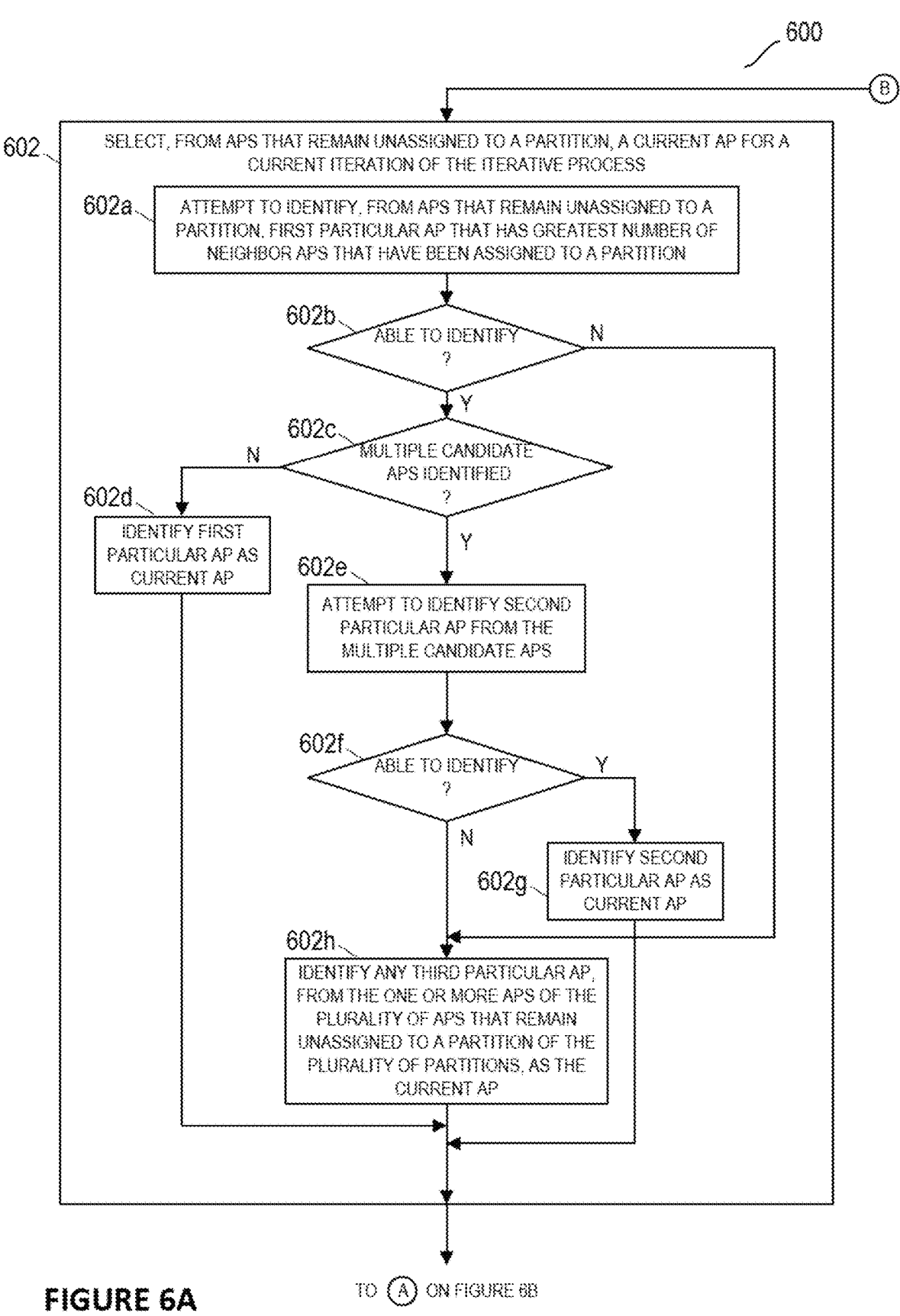
FIGS. 6A-6B illustrate an example method for dividing APs of a communication network into partitions using a vertex coloring algorithm, according to certain implementations.
Figure 6B:
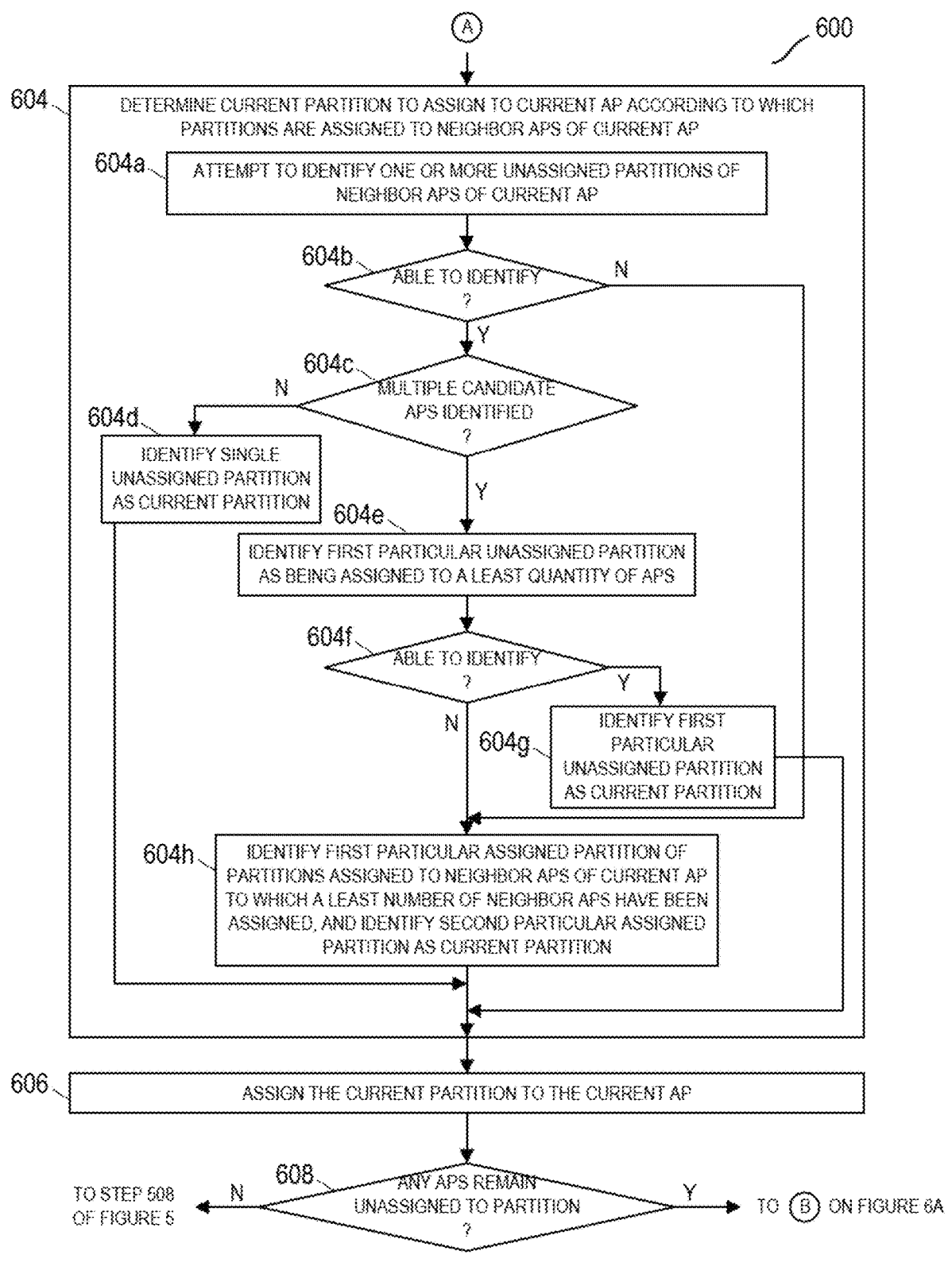

FIGS. 6A-6B illustrate an example method 600 for dividing APs of a communication network into partitions using a vertex coloring algorithm, according to certain implementations. Method 600 will be described using managed communication network 102, APs 108, user devices 110, and update management system 104 as an example. In certain implementations, some or all of the operations of method 600 are performed by update management system 104 (e.g., by update management logic 212 of FIG. 2).

Method 600 may be an iterative process. In certain implementations, at the beginning of method 600, APs 108 initially are categorized as unpartitioned and each partition initially includes no assigned APs 108. Additionally, in certain implementations, update management system 102 (e.g., update management logic 212) already has determined a quantity of partitions into which APs 108 will be divided. In certain implementations, prior to applying the iterative process, using network information 210, update management logic 212 may have generated a neighbor graph (e.g., neighbor graph 400 of FIG. 4) in which APs 108 may correspond to vertices of the neighbor graph, and neighbor relationships of APs 108 may correspond to edges of the neighbor graph. In applying the iterative process, update management system access network information 210, the generated neighbor graph, partition information 214, and/or any other suitable information.

At step 602, update management system 104 may select, according to network information 210, a current AP 108 from the APs 108 of managed communication network 102 that remain unassigned to a partition of determined partitions, if any. This disclosure contemplates any suitable technique for update management system 104 to make this selection. Steps 602*a* through 602*h* illustrate an example technique for update management system 104 to make this selection.

At step 602*a*, update management system 104 may attempt to identify, from the one or more APs 108 that remain unassigned to a partition, a first particular AP 108 that has a greatest quantity of neighbor APs 108 that have been assigned to a partition. At step 602*b*, update management system 104 may determine whether a first particular AP 108 that has a greatest quantity of neighbor APs 108 that have been assigned to a partition was identified at step 602*a*. In certain implementations, steps 602*a* and 602*b* may be merged as a single determination.

If update management system 104 is unable to identify, from the one or more APs 108 that remain unassigned to a partition, a first particular AP 108 that has a greatest quantity of neighbor APs 108 that have been assigned to a partition, then method 600 may proceed to step 602*h*, described in greater detail below. If update management system 104 identifies, from the one or more APs 108 that remain unassigned to a partition, a first particular AP 108 that has a greatest quantity of neighbor APs 108 that have been assigned to a partition, then method 600 may proceed to step 602*c*. At step 602*c*, update management system 104 may determine whether multiple APs 108 that have a greatest quantity of neighbor APs 108 that have been assigned to a partition were identified from the one or more APs 108 that remain unassigned to a partition. If update management system 104 determines that multiple APs 108 were not identified (e.g., only the first particular AP 108 was identified), then method 600 may proceed to 602d, where update management system 104 identifies the first particular AP 108 as the current AP 108, and method 600 may proceed to step 604 using the first particular AP 108 as the current AP 108.

Returning to step 602c, if update management system 104 determines that multiple APs 108 were identified (e.g., multiple APs 108 were tied as having a greatest quantity of neighbor APs 108 that have been assigned to a partition were identified from the one or more APs 108 that remain unassigned to a partition), then method 600 may proceed to 602e. At step 602e, update management system 104 may attempt to identify a second particular AP 108 from the multiple candidate APs 108 identified at steps 602a-602c. In certain implementations, update management system 104 may select as the second particular AP 108 the AP 108 that has the greatest quantity of neighbor APs 108, whether those neighbor APs 108 have been assigned a partition or not. At step 602f, update management system 104 may determine whether a second particular AP 108 was identified at step 602e. If update management system 104 was able to identify a second particular AP 108 at steps 602e-602f, then update management system 104 may identify the second particular AP 108 as the current AP 108, and method 600 may proceed to step 604 using the second particular AP 108 as the current AP 108. If update management system 104 was unable to identify a second particular AP 108 (e.g., at steps 602e through 602g), then method 600 may proceed to step 602h.

At step 602h, update management system 104 may identify, from the one or more APs 108 that remain unassigned to a partition, any third particular AP 108 as the current AP 108, and method 600 may proceed to step 604 using the third particular AP 108 as the current AP 108. Thus, in the illustrated example, step 602h may be reached when update management system 104 is unable to identify either a first particular AP 108 (an AP 108, from the one or more APs 108 that remain unassigned to a partition, that has a greatest quantity of neighbor APs 108 that have been assigned to a partition) or a second particular AP 108 (an AP 108 from the multiple candidate APs 108 identified at steps 602a-602c that has the greatest quantity of neighbor APs 108, whether those neighbor APs 108 have been assigned a partition or not).

At step 604, update management system 104 may determine a current partition to assign to the current AP 108 according to which partitions are assigned to neighbor APs 108 of the current AP 108, a current partition to assign to the current AP 108. This disclosure contemplates any suitable technique for update management system 104 to make this determination. Steps 604a through 604h illustrate an example technique for update management system 104 to make this determination.

At step 604a, update management system 104 may attempt to identify one or more unassigned partitions of neighbor APs 108 of the current AP 108. At step 604b, update management system 104 may determine whether any unassigned partitions were identified at step 604a. In certain implementations, steps 604a and 604b may be merged as a single determination.

If update management system 104 is unable to identify one or more unassigned partitions of neighbor APs 108 of the current AP 108, then method 600 may proceed to step 604h, described in greater detail below. If update management system 104 identifies one or more unassigned partitions of neighbor APs 108 of the current AP 108, then method 600 may proceed to step 604c. At step 604c, update management system 104 may determine whether multiple unassigned partitions of neighbor APs 108 of the current AP 108 were identified at step 604a. If update management system 104 determines that multiple unassigned partitions of neighbor APs 108 of the current AP 108 were not identified (e.g., only one unassigned partition of neighbor APs 108 was identified), then method 600 may proceed to 604d, where update management system 104 identifies the single unassigned partition of neighbor APs 108 as the current partition, and method 600 may proceed to step 606 using the single unassigned partition as the current partition.

Returning to step 604c, if update management system 104 determines that multiple unassigned partitions of neighbor APs 108 of the current AP 108 were identified at step 604a, then method 600 may proceed to 604e. At step 604e, update management system 104 may attempt to identify a first particular unassigned partition of the multiple unassigned partitions as being assigned to the least quantity of APs 108. At step 604f, update management system 104 may determine whether a first particular partition was identified at step 604e. If update management system 104 was able to identify a first particular partition at steps 604e-604f, then update management system 104 may identify the first particular partition as the current partition, and method 600 may proceed to step 604 using the first partition as the current partition. If update management system 104 was unable to identify a first particular partition (e.g., at steps 604e through 604g), then method 600 may proceed to step 604h.

At step 604h, update management system 104 may identify, from the one or more partitions assigned to neighbor APs 108 of the current AP 108, a second particular partition of partitions assigned to neighbor APs 108 of the current AP 108 to which a least quantity of neighbor APs 108 have been assigned. In other words, if it is not possible for update management system 104 to identify an unassigned partition from among the neighboring APs 108 of the current APs 108 (e.g., at steps 604a-604g), then at step 604h update management system 104 may identify, as the second particular partition, the partition that has been assigned a least quantity of times to the neighboring APs 108 of the current APs 108, and identify that second particular partition as the current partition.

At step 606, update management system 104 may assign the current partition to the current AP 108. In certain implementations, update management system 104 may update partition information 214 to reflect the assignment of the current partition to the current AP 108.

At step 608, update management system 104 may determine whether any APs 108 remain unassigned to a partition. If update management system 104 determines at step 608 that one or more APs 108 remain unassigned to a partition, then method 600 may return to step 602 to perform a next iteration of the iterative process of method 600. If update management system 104 determines at step 608 that no APs 108 that are unassigned to a partition remain (e.g., that all APs 108 have been assigned to a partition), then method 600 may terminate, potentially returning to step 508 of FIG. 5 to transmit software update instructions 220 according to the partitioning of APs 108.

FIG. 7 illustrates an example method 700 for updating APs of a communication network, according to certain implementations. Method 700 will be described using managed communication network 102, APs 108, user devices 110, and update management system 104 as an example. In certain implementations, some or all of the operations of method 700 are performed by update management system 104 (e.g., by update management logic 212 of FIG. 2).

At step 702, update management system 104 may divide APs 108 into multiple partitions according to an iterative process. In certain implementations, update management system 104 may have previously determined of a quantity of partitions in which to divide APs 108. In certain implementations, prior to applying the iterative process, using network information 210, update management logic 212 may have generated a neighbor graph (e.g., neighbor graph 400 of FIG. 4) in which APs 108 may correspond to vertices of the neighbor graph, and neighbor relationships of APs 108 may correspond to edges of the neighbor graph. In applying the iterative process, update management system access network information 210, the generated neighbor graph, partition information 214, and/or any other suitable information. In certain implementations, the iterative process includes steps 702a-702d, which are described below.

At step 702a, update management system 104 may select, from the APs 108 that remain unassigned to a partition of the quantity of partitions, a current AP 108 for a current iteration of the iterative process. At step 702b, update management system 104 may identify, according to one or more partitions assigned to neighbor APs 108 of the current AP 108, a selected partition to assign to the current AP 108. At step 702c, update management system 104 may assign, in response to identifying the selected partition, the selected partition to the current AP 108. At step 702d, update management system 104 may perform, in response to determining that one or more of the APs 108 of the APs 108 remain unassigned to a partition following assigning of the selected partition to the current AP 108, a next iteration of the iterative process.

At step 704, update management system 104 may transmit, in response to determining that the APs 108 (e.g., all APs 108 of managed communication network 102) have been assigned a corresponding partition of the determined partitions, software update instructions 220 to APs 108. Software update instructions 220 are to cause APs 108 of a first partition of the plurality of partitions to execute a reboot for installing a software update (e.g., a software version 208) on the APs 108 of the first partition at a different time than APs 108 of a second partition of the plurality of partitions execute a reboot for installing the software update (e.g., a software version 208) on APs 108 of the second partition.

Figure 8:
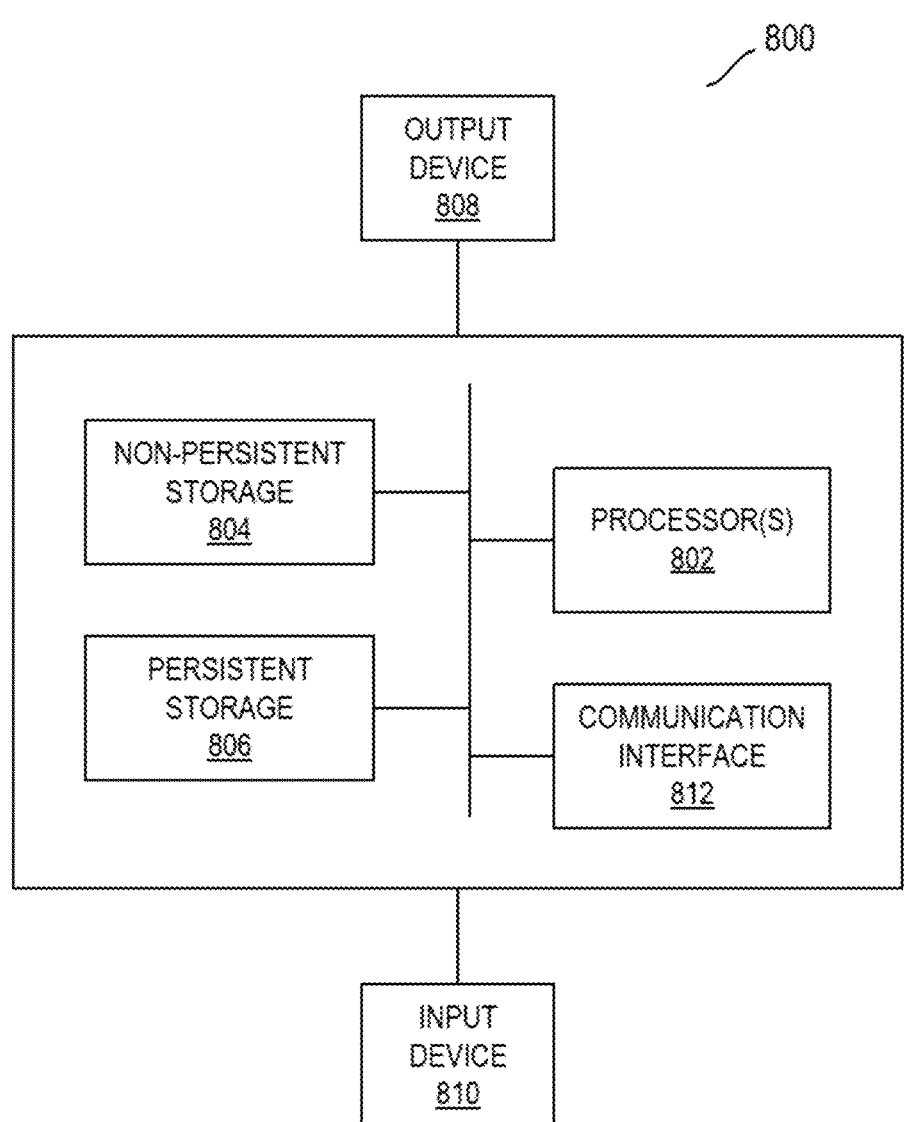
FIG. 8 illustrates a block diagram of an example computer system, according to certain implementations.

FIG. 8 illustrates a block diagram of an example computing device 800, according to certain implementations. As discussed above, implementations of this disclosure may be implemented using computing devices. For example, all or any portion of the components or methods shown in FIGS. 1-7 (e.g., system 100, update management system 104, APs 108, user devices 110, and methods 500 through 700) may be implemented, at least in part, using one or more computing devices such as computing device 800.

Computing device 800 may include one or more computer processors 802, non-persistent storage 804 (e.g., volatile memory, such as random access memory (RAM), cache memory, etc.), persistent storage 806 (e.g., a hard disk, an optical drive such as a compact disk (CD) drive or digital versatile disk (DVD) drive, a flash memory, etc.), a communication interface 812 (e.g., Bluetooth interface, infrared interface, network interface, optical interface, etc.), input devices 810, output devices 808, and numerous other elements and functionalities. Each of these components is described below.

In certain implementations, computer processor(s) 802 may be an integrated circuit for processing instructions. For example, computer processor(s) may be one or more cores or micro-cores of a processor. Processor 802 may be a general-purpose processor configured to execute program code included in software executing on computing device 800. Processor 802 may be a special purpose processor where certain instructions are incorporated into the processor design. Although only one processor 802 is shown in FIG. 8, computing device 800 may include any number of processors.

Computing device 800 may also include one or more input devices 810, such as a touchscreen, keyboard, mouse, microphone, touchpad, electronic pen, motion sensor, or any other type of input device. Input devices 810 may allow a user to interact with computing device 800. In certain implementations, computing device 800 may include one or more output devices 808, such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) 802, non-persistent storage 804, and persistent storage 806. Many different types of computing devices exist, and the aforementioned input and output device(s) may take other forms. In some instances, multimodal systems can allow a user to provide multiple types of input/output to communicate with computing device 800.

Further, communication interface 812 may facilitate connecting computing device 800 to a network (e.g., a LAN, WAN) such as the Internet, mobile network, or any other type of network) and/or to another device, such as another computing device. Communication interface 812 may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a Bluetooth® wireless signal transfer, a Bluetooth® Low Energy (BLE) wireless signal transfer, an IBEACON® wireless signal transfer, a radio frequency identifier (RFID) wireless signal transfer, near-field communications (NFC) wireless signal transfer, dedicated short range communication (DSRC) wireless signal transfer, 802.11 Wi-Fi wireless signal transfer, WLAN signal transfer, Visible Light Communication (VLC), Worldwide Interoperability for Microwave Access (WiMAX), IR communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 812 may also include one or more Global Navigation Satellite System (GNSS) receivers or transceivers that are used to determine a location of the computing device 800 based on receipt of one or more signals from one or more satellites associated with one or more GNSS systems. GNSS systems include, but are not limited to, the US-based global positioning system (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

The term computer-readable medium includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

All or any portion of the components of computing device 800 may be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), CPUs, and/or other suitable electronic circuits), and/or can include and/or be implemented using computer software, firmware, or any combination thereof, to perform the various operations described herein. In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Certain implementations may provide none, some, or all of the following technical advantages. These and other potential technical advantages may be described elsewhere in this disclosure, or may otherwise be readily apparent to those skilled in the art based on this disclosure.

Certain implementations of this disclosure may provide one or more technical advantages. Certain implementations may implement a more strategic approach to updating the software of APs deployed and operating throughout a communication network that allows a subset of the APs to remain live while other APs are rebooted as part of the update process. For example, relative to certain other techniques for partitioning APs for software updates, certain implementations may reduce a quantity of partitions, which may decrease overall software update time. As a particular example, for dense deployments of APs, certain implementations may result in two-to-six partitions rather than twenty or more as might be generated with other techniques (e.g., RF-channel-based partitioning) for partitioning APs for a software update. Certain implementations may allow the quantity of partitions to be tailored based on actual user device load on the communication network. For example, a lightly-loaded communication network might be updated even faster with just two partitions, if appropriate. In certain implementations, even if additional RF channels are created dynamically through operation of the communication network, the quantity of partitions may remain the same, potentially increasing predictability of software update time. Of course, with any of these examples, the particular quantity of partitions may depend on a variety of factors.

Certain implementations may reduce network disruptions relative to other solutions for performing a live software update, which may reduce or eliminate negative impacts to an organization during a software update. In scenarios in which the software update is provided or managed by a third party (e.g., a service provider), the reduced disruptions to a communication network may increase customer confidence in the software update process.

It should be understood that the systems and methods described in this disclosure may be combined in any suitable manner.

Although this disclosure describes or illustrates particular operations as occurring in a particular order, this disclosure contemplates the operations occurring in any suitable order. Moreover, this disclosure contemplates any suitable operations being repeated one or more times in any suitable order. Although this disclosure describes or illustrates particular operations as occurring in sequence, this disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

While this disclosure has been described with reference to illustrative implementations, this description is not intended to be construed in a limiting sense. Various modifications and combinations of the illustrative implementations, as well as other implementations of the disclosure, will be apparent to persons skilled in the art upon reference to the description. It is therefore intended that the appended claims encompass any such modifications or implementations.

What is claimed is:

1. A computer system, comprising:

one or more processors; and one or more non-transitory computer-readable storage media storing programming for execution by the one or more processors, the programming comprising instructions to:

obtain network information for a plurality of access points (APs), the plurality of APs configured to provide one or more user devices with access to a communication network;

determine, according to the network information, a plurality of partitions in which to divide the plurality of APs for deploying a software update to the plurality of APs;

divide, according to a vertex coloring algorithm, the plurality of APs into the plurality of partitions, the APs of the plurality of APs corresponding to vertices of the vertex coloring algorithm and neighbor relationships of the APs of the plurality of APs corresponding to edges of the vertex coloring algorithm, wherein the vertex coloring algorithm attempts to assign neighboring APs to different partitions; and transmit software update instructions to the plurality of APs, the software update instructions to cause APs of a first partition of the plurality of partitions to execute a reboot for installing the software update on the APs of the first partition at a different time than APs of a second partition of the plurality of partitions execute a reboot for installing the software update on the APs of the second partition.

2. The computer system of claim 1, wherein the network information comprises:

device identifiers for each of the plurality of APs; and neighbor information for each of the plurality of APs.

3. The computer system of claim 1, wherein:

the instructions further comprise instructions to determine, according to the network information:

a quantity of APs in the plurality of APs; and a quantity of user devices served by the plurality of APs; and the instructions to determine the plurality of partitions comprise instructions to determine the plurality of partitions according to the quantity of APs in the plurality of APs and the quantity of user devices served by the plurality of APs.

4. The computer system of claim 1, wherein:

the plurality of APs comprise a first AP, a second AP, a third AP, and a fourth AP;

the first AP is a neighbor of the second AP;

the second AP is a neighbor of the third AP;

the first AP and the third AP are not neighbors; and the fourth AP is not a neighbor of the first AP, the second AP, or the third AP.

5. The computer system of claim 1, wherein the instructions to divide, according to the vertex coloring algorithm, the plurality of APs into the plurality of partitions comprise instructions to execute an iterative process that comprises, for each AP of the plurality of APs:

selecting, according to the network information, a current AP from one or more APs of the plurality of APs that remain unassigned to a partition of the plurality of partitions;

determining a current partition to assign to the current AP according to which partitions of the plurality of partitions are assigned to neighbor APs of the current AP;

assigning the current partition to the current AP; and performing, in response to determining that one or more APs of the plurality of APs remain unassigned to a partition of the plurality of partitions, a next iteration of the iterative process.

6. The computer system of claim 5, wherein the instructions to select, according to the network information, the current AP from the one or more APs of the plurality of APs that remain unassigned to a partition of the plurality of partitions, comprise instructions to:

attempt to identify, from the one or more APs of the plurality of APs that remain unassigned to a partition, a first particular AP that has a greatest quantity of neighbor APs that have been assigned to a partition of the plurality of partitions;

identify, in response to identifying the first particular AP, from the one or more APs of the plurality of APs that remain unassigned to a partition, that has a greatest quantity of neighbor APs that have been assigned to a partition of the plurality of partitions, the first particular AP as the current AP;

attempt to identify, in response to identifying multiple candidate particular APs, from the one or more APs of the plurality of APs that remain unassigned to a partition, as having a same greatest quantity of neighbor APs that have been assigned to a partition of the plurality of partitions, a second particular AP from the multiple candidate particular APs as having a greatest quantity of neighbor APs;

identify, in response to identifying a second particular AP, from the one or more APs of the plurality of APs that remain unassigned to a partition, as having a same greatest quantity of neighbor APs that have been assigned to a partition of the plurality of partitions, the second particular AP as the current AP; and identify, in response to being unable to identify a second particular AP, from the one or more APs of the plurality of APs that remain unassigned to a partition, as having a same greatest quantity of neighbor APs that have been assigned to a partition of the plurality of partitions, any third particular AP, from the one or more APs of the plurality of APs that remain unassigned to a partition of the plurality of partitions, as the current AP.

7. The computer system of claim 5, wherein the instructions to determine the current partition to assign to the current AP according to which partitions of the plurality of partitions are assigned to neighbor APs of the current APs comprise instructions to:

attempt to identify one or more unassigned partitions of neighbor APs of the current AP;

identify, in response to identifying a single unassigned partition of neighbor APs of the current AP, the single unassigned partition as the current partition;

identify, in response to identifying multiple unassigned partitions of neighbor APs of the current AP, a first particular unassigned partition of the multiple unassigned partitions as being assigned to a least quantity of APs of the plurality of APs, and identify the first particular unassigned partition as the current partition; and identify, in response to being unable to identify one or more unassigned partitions of neighbor APs of the current AP, a first particular assigned partition of partitions assigned to neighbor APs of the current AP to which a least quantity of neighbor APs have been assigned, and identify the first particular assigned partition as the current partition.

8. The computer system of claim 5, wherein:

the plurality of APs initially are categorized as unpartitioned; and each partition of the plurality of partitions initially includes no assigned APs.

9. A computer-implemented method, comprising:

obtaining network information for a plurality of access points (APs), the plurality of APs configured to provide one or more user devices with access to a communication network;

determining, according to the network information, a plurality of partitions in which to divide the plurality of APs for deploying a software update to the plurality of APs;

dividing, according to a vertex coloring algorithm, the plurality of APs into the plurality of partitions, the APs of the plurality of APs corresponding to vertices of the vertex coloring algorithm and neighbor relationships of the APs of the plurality of APs corresponding to edges of the vertex coloring algorithm, wherein the vertex coloring algorithm attempts to assign neighboring APs to different partitions; and transmitting software update instructions to the plurality of APs, the software update instructions to cause APs of a first partition of the plurality of partitions to execute a reboot for installing the software update on the APs of the first partition at a different time than APs of a second partition of the plurality of partitions execute a reboot for installing the software update on the APs of the second partition.

10. The computer-implemented method of claim 9, wherein the network information comprises:
device identifiers for each of the plurality of APs; and
neighbor information for each of the plurality of APs.

11. The computer-implemented method of claim 9, wherein:
the method further comprises determining, according to the network information:
a quantity of APs in the plurality of APs; and
a quantity of user devices served by the plurality of APs; and
determining the plurality of partitions comprises determining the plurality of partitions according to the quantity of APs in the plurality of APs and the quantity of user devices served by the plurality of APs.

12. The computer-implemented method of claim 9, wherein dividing, according to the vertex coloring algorithm, the plurality of APs into the plurality of partitions comprises executing an iterative process that comprises, for each AP of the plurality of APs:
selecting, according to the network information, a current AP from one or more APs of the plurality of APs that remain unassigned to a partition of the plurality of partitions;
determining a current partition to assign to the current AP according to which partitions of the plurality of partitions are assigned to neighbor APs of the current AP;
assigning the current partition to the current AP; and
performing, in response to determining that one or more APs of the plurality of APs remain unassigned to a partition of the plurality of partitions, a next iteration of the iterative process.

13. The computer-implemented method of claim 12, wherein selecting, according to the network information, the current AP from the one or more APs of the plurality of APs that remain unassigned to a partition of the plurality of partitions, comprises:
attempting to identify a first particular AP, from the one or more APs of the plurality of APs that remain unassigned to a partition, that has a greatest quantity of neighbor APs that have been assigned to a partition of the plurality of partitions; and
identifying, in response to identifying the first particular AP, from the one or more APs of the plurality of APs that remain unassigned to a partition, that has a greatest quantity of neighbor APs that have been assigned to a partition of the plurality of partitions, the first particular AP as the current AP.

14. The computer-implemented method of claim 12, wherein selecting, according to the network information, the current AP from the one or more APs of the plurality of APs that remain unassigned to a partition of the plurality of partitions, comprises:
attempting to identify a first particular AP, from the one or more APs of the plurality of APs that remain unassigned to a partition, that has a greatest quantity of neighbor APs that have been assigned to a partition of the plurality of partitions;
attempting to identify, in response to identifying multiple candidate particular APs, from the one or more APs of the plurality of APs that remain unassigned to a partition, as having a same greatest quantity of neighbor APs that have been assigned to a partition of the plurality of partitions, a second particular AP from the multiple candidate particular APs as having a greatest quantity of neighbor APs; and
identifying, in response to identifying a second particular AP, from the one or more APs of the plurality of APs that remain unassigned to a partition, as having a same greatest quantity of neighbor APs that have been assigned to a partition of the plurality of partitions, the second particular AP as the current AP.

15. The computer-implemented method of claim 12, wherein selecting, according to the network information, the current AP from the one or more APs of the plurality of APs that remain unassigned to a partition of the plurality of partitions, comprises:
attempting to identify a first particular AP, from the one or more APs of the plurality of APs that remain unassigned to a partition, that has a greatest quantity of neighbor APs that have been assigned to a partition of the plurality of partitions;
attempting to identify, in response to identifying multiple candidate particular APs, from the one or more APs of the plurality of APs that remain unassigned to a partition, as having a same greatest quantity of neighbor APs that have been assigned to a partition of the plurality of partitions, a second particular AP from the multiple candidate particular APs as having a greatest quantity of neighbor APs; and
identifying, in response to being unable to identify a second particular AP, from the one or more APs of the plurality of APs that remain unassigned to a partition, as having a same greatest quantity of neighbor APs that have been assigned to a partition of the plurality of partitions, any third particular AP, from the one or more APs of the plurality of APs that remain unassigned to a partition of the plurality of partitions, as the current AP.

16. The computer-implemented method of claim 12, wherein determining the current partition to assign to the current AP according to which partitions of the plurality of partitions are assigned to neighbor APs of the current APs comprises:
attempting to identify one or more unassigned partitions of neighbor APs of the current AP; and
identifying, in response to identifying a single unassigned partition of neighbor APs of the current AP, the single unassigned partition as the current partition.

17. The computer-implemented method of claim 12, wherein determining the current partition to assign to the current AP according to which partitions of the plurality of partitions are assigned to neighbor APs of the current APs comprises:
attempting to identify one or more unassigned partitions of neighbor APs of the current AP; and
identifying, in response to identifying multiple unassigned partitions of neighbor APs of the current AP, a first particular unassigned partition of the multiple unassigned partitions as being assigned to a least quantity of APs of the plurality of APs, and identify the first particular unassigned partition as the current partition.

18. The computer-implemented method of claim 12, wherein determining the current partition to assign to the current AP according to which partitions of the plurality of partitions are assigned to neighbor APs of the current APs comprises:
attempting to identify one or more unassigned partitions of neighbor APs of the current AP; and
identify, in response to being unable to identify one or more unassigned partitions of neighbor APs of the current AP, a first particular assigned partition of partitions assigned to neighbor APs of the current AP to which a least quantity of neighbor APs have been assigned, and identify the first particular assigned partition as the current partition.

19. The computer-implemented method of claim 12, wherein:

the plurality of APs initially are categorized as unpartitioned; and each partition of the plurality of partitions initially includes no assigned APs.

20. One or more non-transitory computer-readable storage media storing programming for execution by one or more processors, the programming comprising instructions to:

divide, according to an iterative process, a plurality of access points (APs) into a plurality of partitions, the iterative process comprising:

selecting, from one or more APs of the plurality of APs that remain unassigned to a partition of the plurality of partitions, a current AP for a current iteration of the iterative process;

identifying, according to one or more partitions assigned to neighbor APs of the current AP, a selected partition to assign to the current AP;

assigning, in response to identifying the selected partition, the selected partition to the current AP; and performing, in response to determining that one or more APs of the plurality of APs remain unassigned to a partition of the plurality of partitions following assigning of the selected partition to the current AP, a next iteration of the iterative process; and transmit, in response to determining that the APs of the plurality of APs have been assigned a corresponding partition of the plurality of partitions, software update instructions to the plurality of APs, the software update instructions to cause APs of a first partition of the plurality of partitions to execute a reboot for installing a software update on the APs of the first partition at a different time than APs of a second partition of the plurality of partitions execute a reboot for installing the software update on the APs of the second partition.

\* \* \* \* \*